(12) United States Patent
Egan et al.

(10) Patent No.: US 12,475,297 B2
(45) Date of Patent: *Nov. 18, 2025

(54) SYSTEM AND METHOD FOR PERFORMING PROCESS MODEL CALIBRATION IN A VIRTUAL SEMICONDUCTOR DEVICE FABRICATION ENVIRONMENT

(71) Applicant: Coventor, Inc., Cary, NC (US)

(72) Inventors: William J. Egan, Framingham, MA (US); Kenneth B. Greiner, Concord, MA (US); David M. Fried, Los Gatos, CA (US); Anshuman Kunwar, Jamaica Plain, MA (US)

(73) Assignee: Coventor, Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,718

(22) Filed: Nov. 7, 2023

(65) Prior Publication Data
US 2024/0070373 A1   Feb. 29, 2024

Related U.S. Application Data

(63) Continuation of application No. 17/477,472, filed on Sep. 16, 2021, now Pat. No. 11,861,289, which is a
(Continued)

(51) Int. Cl.
G06F 30/398   (2020.01)
G06F 3/04815  (2022.01)
(Continued)

(52) U.S. Cl.
CPC ........ *G06F 30/398* (2020.01); *G06F 3/04815* (2013.01); *G06F 3/04847* (2013.01);
(Continued)

(58) Field of Classification Search
CPC .............. G06F 30/398; G06F 3/04815; G06F 3/04847; G06F 2111/10; G06F 30/367;
(Continued)

(56) References Cited

U.S. PATENT DOCUMENTS 5,416,729 A    5/1995  Leon et al.
5,473,710 A    12/1995 Jaw et al.
(Continued)

FOREIGN PATENT DOCUMENTS

CN    103823917 A    5/2014
CN    103970954 A    8/2014
(Continued)

OTHER PUBLICATIONS

Koehler E, Brown E, Haneuse SJ. On the Assessment of Monte Carlo Error in Simulation-Based Statistical Analyses. Am Stat. May 1, 2009;63(2):155-162. doi: 10.1198/tast.2009.0030. PMID: 22544972; PMCID: PMC3337209. (Year: 2009).*
(Continued)

*Primary Examiner* — William A Beutel
(74) *Attorney, Agent, or Firm* — Weaver Austin Villeneuve & Sampson LLP

(57) ABSTRACT

A virtual fabrication environment for semiconductor device fabrication that includes an analytics module for performing key parameter identification, process model calibration and variability analysis is discussed.

20 Claims, 29 Drawing Sheets

Related U.S. Application Data continuation of application No. 16/010,537, filed on Jun. 18, 2018, now Pat. No. 11,144,701.

(60) Provisional application No. 62/631,022, filed on Feb. 15, 2018, provisional application No. 62/521,506, filed on Jun. 18, 2017.

(51) Int. Cl.
   *G06F 3/04847* (2022.01)
   *G06T 19/20* (2011.01)
   *G06F 111/10* (2020.01)

(52) U.S. Cl.
   CPC .......... *G06T 19/20* (2013.01); *G06F 2111/10* (2020.01); *G06T 2200/16* (2013.01); *G06T 2219/2004* (2013.01)

(58) Field of Classification Search
   CPC .. G06F 2111/18; G06T 19/20; G06T 2200/16; G06T 2219/2004
   See application file for complete search history.

(56) References Cited

U.S. PATENT DOCUMENTS

| | | | |
|---|---|---|---|
| 6,116,766 | A | 9/2000 | Maseeh et al. |
| 7,492,364 | B2 | 2/2009 | Devarajan et al. |
| 7,526,739 | B2 | 4/2009 | McIlrath |
| 8,032,857 | B2 | 10/2011 | McIlrath |
| 8,209,649 | B2 | 6/2012 | McIlrath |
| 8,266,560 | B2 | 9/2012 | McIlrath |
| 8,285,412 | B2 | 10/2012 | Kyoh |
| 8,606,774 | B1 | 12/2013 | Makadia et al. |
| 8,691,599 | B2 | 4/2014 | Guo et al. |
| 8,832,620 | B1 | 9/2014 | Fried et al. |
| 8,959,464 | B2 | 2/2015 | Greiner et al. |
| 9,317,632 | B2 | 4/2016 | Faken et al. |
| 9,965,577 | B2 | 5/2018 | Kamon et al. |
| 10,242,142 | B2 | 3/2019 | Greiner et al. |
| 11,144,701 | B2 | 10/2021 | Egan et al. |
| 11,861,289 | B2 | 1/2024 | Egan et al. |
| 2002/0037596 | A1 | 3/2002 | Yamaguchi |
| 2005/0076316 | A1 | 4/2005 | Pierrat et al. |
| 2005/0198602 | A1 | 9/2005 | Brankner |
| 2005/0240895 | A1 | 10/2005 | Smith et al. |
| 2006/0054088 | A1 | 3/2006 | Jagawa et al. |
| 2007/0031745 | A1 | 2/2007 | Ye et al. |
| 2007/0035716 | A1 | 2/2007 | Yoshii et al. |
| 2007/0100487 | A1 | 5/2007 | Cheng et al. |
| 2007/0118349 | A1 | 5/2007 | Jakatdar et al. |
| 2007/0198114 | A1 | 8/2007 | Hashima et al. |
| 2008/0058978 | A1 | 3/2008 | Cain et al. |
| 2008/0104562 | A1 | 5/2008 | Ichinose |
| 2009/0006039 | A1 | 1/2009 | Watanabe |
| 2009/0024377 | A1 | 1/2009 | Min |
| 2009/0055789 | A1 | 2/2009 | McIlrath |
| 2009/0064058 | A1 | 3/2009 | McIlrath |
| 2009/0144042 | A1 | 6/2009 | Lorenz et al. |
| 2009/0249263 | A1 | 10/2009 | Arimoto |
| 2010/0005437 | A1 | 1/2010 | McIlrath |
| 2010/0180241 | A1 | 7/2010 | Asai |
| 2011/0138343 | A1 | 6/2011 | Granik |
| 2011/0153271 | A1 | 6/2011 | Tiwary et al. |
| 2011/0185323 | A1 | 7/2011 | Hogan et al. |
| 2011/0289472 | A1 | 11/2011 | Finkler et al. |
| 2011/0314437 | A1 | 12/2011 | McIlrath |
| 2012/0119096 | A1* | 5/2012 | Vija ........................ A61B 6/58 250/370.08 |
| 2012/0129301 | A1 | 5/2012 | Or-Bach et al. |
| 2012/0239178 | A1 | 9/2012 | Wu et al. |
| 2012/0248595 | A1 | 10/2012 | Or-Bach et al. |
| 2012/0264237 | A1 | 10/2012 | Shearn et al. |
| 2012/0264514 | A1 | 10/2012 | Lee et al. |
| 2012/0317528 | A1 | 12/2012 | McIlrath |
| 2013/0130498 | A1 | 5/2013 | Feustel et al. |
| 2013/0275937 | A1 | 10/2013 | Joshi et al. |
| 2013/0339918 | A1 | 12/2013 | Clark |
| 2014/0278266 | A1* | 9/2014 | Faken ........................ G06F 30/20 703/1 |
| 2014/0282324 | A1 | 9/2014 | Greiner et al. |
| 2014/0282328 | A1 | 9/2014 | Fried et al. |
| 2015/0195091 | A1* | 7/2015 | Kubota ................... H04L 9/321 713/191 |
| 2017/0039308 | A1 | 2/2017 | Moroz et al. |
| 2018/0095936 | A1 | 4/2018 | Bonnecaze et al. |
| 2018/0365370 | A1 | 12/2018 | Egan et al. |
| 2019/0065630 | A1 | 2/2019 | Kim et al. |
| 2019/0163075 | A1 | 5/2019 | Theeuwes et al. |
| 2019/0286780 | A1 | 9/2019 | Greiner et al. |
| 2020/0356711 | A1 | 11/2020 | Egan et al. |
| 2022/0019724 | A1 | 1/2022 | Egan et al. |
| 2022/0198333 | A1 | 6/2022 | Pack et al. |
| 2023/0252211 | A1 | 8/2023 | Egan et al. |

FOREIGN PATENT DOCUMENTS

| | | |
|---|---|---|
| CN | 105830069 A | 8/2016 |
| CN | 109145354 A | 1/2019 |
| GB | 2482076 A | 1/2012 |
| JP | H0536832 A | 2/1993 |
| JP | H07115071 A | 5/1995 |
| JP | H08107050 A | 4/1996 |
| JP | 2002305253 A | 10/2002 |
| JP | 2003324041 A | 11/2003 |
| JP | 2003345854 A | 12/2003 |
| JP | 2005019524 A | 1/2005 |
| JP | 2006178907 A | 7/2006 |
| JP | 2006268558 A | 10/2006 |
| JP | 2007507889 A | 3/2007 |
| JP | 2007535135 A | 11/2007 |
| JP | 2008034714 A | 2/2008 |
| JP | 2011082562 A | 4/2011 |
| JP | 2011113291 A | 6/2011 |
| JP | 2016004421 A | 1/2016 |
| JP | 2016512641 A | 4/2016 |
| JP | 2017037441 A | 2/2017 |
| JP | 2017090947 A | 5/2017 |
| JP | 2021504743 A | 2/2021 |
| KR | 20160110116 A | 9/2016 |
| KR | 20220125208 A | 9/2022 |
| TW | 200849052 A | 12/2008 |
| TW | 200912888 A | 3/2009 |
| TW | I342469 B | 5/2011 |
| TW | 201500949 A | 1/2015 |
| TW | 201500950 A | 1/2015 |
| TW | 201539226 A | 10/2015 |
| TW | I624764 B | 5/2018 |
| TW | 201913849 A | 4/2019 |
| WO | WO-2011078930 A1 | 6/2011 |
| WO | WO-2015112979 A1 | 7/2015 |
| WO | WO-2022015897 A1 | 1/2022 |

OTHER PUBLICATIONS

Research Gate ("Are 200 replicates per scenario enough for a simulation study?", published at https://www.researchgate.net/post/Are-200-replicates-per-scenario-enough-for-a-simulation-study as of Jun. 4, 2014 (Year: 2014).*

L. J. Martin and J. Frei, "Application of statistical tools and methods for high density substrate process development [printed circuit board fabrication]," 52nd Electronic Components and Technology Conference 2002. (Cat. No. 02CH37345), San Diego, CA, USA, 2002, pp. 690-699 (Year: 2002).*

Clark et al., "A million wafer, virtual fabrication approach to determine process capability requirements for an industry-standard 5nm BEOL two-level metal flow," Simulation of Semiconductor Processes and Devices, IEEE, 2016, pp. 43-46.

CN Office Action dated May 12, 2024 in CN Application No. 201810629679.9 with English translation.

Conover W J., "Practical Nonparametric Statistics," Third Edition. John Wiley & Sons, Inc., New York, 1999, pp. 442-447.

(56) References Cited

OTHER PUBLICATIONS

Czitrom, "One-factor-at-a-time versus designed experiments," The American Statistician. May 1, 1999, vol. 53(2), pp. 126-131.
Davies R H., et al., "Building 3-D statistical Shape Models by Direct Optimization," IEEE Transactions on Medical Imaging, vol. 29(4), Apr. 2010, pp. 961-981.
Egan J W et al., "Measurement of Carboxyhemoglobin in Forensic Blood Samples Using UV-Visible Spectrometry and Improved Principal Component Regression," Applied Spectroscopy. Feb. 1, 1999 vol. 53(2), pp. 218-225.
Fisher, "Design of Experiments," Hafner Publishing Company, New York. p. 94, (1971).
Genesys 2009.04 User Guide: Yield/Monte Carlo, 2010, pp. 1-14.
Greenwood et al., "Sample size required for estimating the standard deviation as a per cent of its true value," Journal of the American Statistical Association, Jun. 1, 1950 vol. 45(250), pp. 257-260.
Guler, S et al., "Bayesian Optimization for Tuning Lithography Processes," IFAC-PapersOnLine, 2021, vol. 54(7), pp. 827-832.
International Search Report and Written Opinion dated Jan. 23, 2024 in PCT Application No. PCT/US2023/033955.
JMP, Design of Experiments Guide, Version 13. JMP Statistical Discovery From SAS. 708 pages, Sep. 2016.
Jones et al., "Definitive screening designs with added two-level categorical factors," Journal of Quality Technology, Apr. 1, 2013, vol. 45(2), pp. 121-129.
Jones et al., "A class of three-level designs for definitive screening in the presence of second-order effects," Journal of quality Technology, Jan. 1, 2011, vol. 43(1), pp. 1-5.
JP Office Action dated Mar. 22, 2023, in application No. JP 2022-103142 with English translation.
JP Office Action dated May 21, 2024 in JP Application No. 2023-066796 with English translation.
JP Office Action dated May 31, 2022, in application No. JP 2018-115285 with English translation.
KR Office Action dated Mar. 14, 2023, in application No. KR 10-2018-0069418 with English translation.
KR Office Action dated Sep. 14, 2022, in application No. KR 10-2018-0069418 with English translation.
Martinez et al., "Computational Statistics Handbook with MATLAB, Second Edition, Computer Science and Data Analysis Series," Chapman & Hall/CRC, Taylor & Francis Group, Boca Raton, 2008, pp. 126-132.
Miller., "Statistical Design and Opt for Amplifiers," Amplifier Design Guide, Sep. 10, 2008, pp. 1-11.
Miller., "Using Statistical Design," Optimization and Statistical Design , May 27, 2014, pp. 1-31.
Montgomery, "Design and Analysis of Experiments," Eighth Edition, John Wiley & Sons, Inc. 2013, pp. 11-21, 183-189.
Neter et al., "Applied Linear Statistical Models," Fourth Edition. Irwin, Chicago. 1996, pp. 288-295, 347-352.
Rasmussen et al., "Gaussian Processes for Machine Learning," The MIT Press, www.GaussianProcess.org/gpml, 2006, pp. 1-266 pages.
Riffenburgh, "Statistics in Medicine," Third Edition. Academic Press, Amsterdam, 2012, pp. 150-151.
Rousseeuw, "Tutorial to robust statistics," Journal of Chemometrics. Jan. 1991, vol. 5(1), pp. 1-20.
Schropfer et al., "Novel 3D Modeling Methods for Virtual Fabrication and EDA Compatible Design of MEMS Via Parametric Libraries," J Micromech Microeng. Jun. 2010, vol. 20(6), pp. 1-15.
Spallek et al., "Modelling and Simulating the Selective Epitaxial Growth of Silicon under Consideration of Anisotropic growth Rates," ESSDERC '03, 33rd Conference on European Solid-State Device Research, 2003, pp. 387-390.
Synopsys, "Sentaurus Workbench Comprehensive Framework Environment," Data Sheet. Synopsys, Inc., 2005, www. ynopsys.com.
TW Office Action dated Aug. 21, 2023 in Application No. TW112119637 with English translation.
TW Office Action dated Feb. 24, 2022, in application No. TW20180120904 with English translation.
TW Office Action dated Jul. 31, 2023 in Application No. TW109115374 with English translation.
TW Office Action dated May 20, 2024 in TW Application No. 113100510 with English translation.
TW Office Action dated Nov. 4, 2022, in application No. TW111136832with English translation.
TW Office Action dated Nov. 21, 2023 in TW Application No. 112119637 with English translation.
U.S. Advisory Action dated Dec. 4, 2023 in U.S. Appl. No. 16/870,518.
U.S. Final office Action dated May 24, 2023 in U.S. Appl. No. 17/477,472.
U.S. Final Office Action dated Sep. 25, 2023, in U.S. Appl. No. 16/870,518.
U.S. Non-Final Office Action dated Feb. 8, 2023, in U.S. Appl. No. 17/477,472.
U.S. Non-Final Office Action dated Jan. 26, 2024 in U.S. Appl. No. 16/870,518.
U.S. Non-Final Office Action dated Mar. 27, 2023, in U.S. Appl. No. 16/870,518.
U.S. Non-Final Office Action dated Nov. 25, 2020, in U.S. Appl. No. 16/010,537.
U.S. Notice of Allowance dated Aug. 7, 2023 in U.S. Appl. No. 17/477,472.
U.S. Notice of Allowance dated Jun. 9, 2021 in U.S. Appl. No. 16/010,537.
U.S. Notice of Allowance dated Nov. 22, 2023 in U.S. Appl. No. 17/477,472.
Xiao et al., "Constructing definitive screening designs using conference matrices," Journal of Quality Technology, 2012 an 1, vol. 44(1), pp. 2-8.
AP Statistics., "Cumulative AP Exam Study Guide," ilearnacademy. net stat review notes, 2017, pp. 1-8.
Autoform_2019., Sensitivity Analysis downloaded from Web.archive. org dated Apr. 3, 2019, 1 page.
"Completion Rate," Science Direct, 2018, pp. 1-8.
ECE723_Lec5_2014., Lecture 5: Lithography MAPUA Institute of Technology, 2014, pp. 1-33.
International Preliminary Report on Patentability and Written Opinion dated Jan. 26, 2023 in PCT Application No. PCT/US2021/041700.
International Search Report and Written Opinion dated Oct. 27, 2021 in PCT Application No. PCT/US2021/041700.
JP Office Action dated Nov. 5, 2024 in JP Application No. 2023-066796, with English Translation.
Kagaiwalla et al., "Design-Aware Mask Inspection," IEEE/ACM International Conference on Computer-Aided Design, 2010, vol. 31(5), pp. 1-8.
KR Office Action dated Dec. 5, 2024 in KR Application No. 10-2024-0052031, with English Translation.
U.S. Advisory Action dated Sep. 16, 2024 in U.S. Appl. No. 16/870,518.
U.S. Final Office Action dated Jul. 9, 2024 in U.S. Appl. No. 16/870,518.
U.S. Non-Final Office Action dated Nov. 6, 2024 in U.S. Appl. No. 16/870,518.
Garnett, Roman "Bayesian Optimization," Lecture Notes, Mar. 16, 2015, from: https://www.cse.wustl.edu/~garnett/cse515t/spring_2015/.
International Preliminary Report on Patentability and Written Opinion dated Apr. 10, 2025 in PCT Application No. PCT/US2023/033955.
TW Office Action and Search Report dated Jun. 4, 2025 in TW Application No. 110125830, with English Translation.
Uhrenholt AK., et al., "Efficient Bayesian Optimization for Target Vector Estimation," Proceedings of Machine Learning Research, 2019, vol. 89, pp. 2661-2670 (10 Pages).
U.S. Notice of Allowance dated Apr. 2, 2025 in U.S. Appl. No. 16/870,518.
U.S. Appl. No. 19/116,586, inventors Lu Y et al., filed Mar. 28, 2025.
KR Decision for Grant and Search Report dated Jun. 25, 2025 in KR Application No. 10-2024-0052031, with English translation.

(56) References Cited

OTHER PUBLICATIONS

KR Office Action dated Aug. 4, 2025 in KR Application No. 10-2023-7005617, with English Translation.

* cited by examiner

Figure 11

| Assembly File | C:\STI_Example\Virtual_3way_Grid\STI_Example.zam |
| Process File | C:\STI_Example\Virtual_3way_Grid\STI_Example.vproc |
| Layout File | C:\STI_Example\Virtual_3way_Grid\Demo_Layouts.cat |
| Layer Map File | |
| Top Cell | Cell6x6 |
| Output directory | STI_Example_batch |
| Working directory | C:\STI_Example\Virtual_3way_Grid |

| Run | 1.1g-depth | 1.22-depth | 2.1-depth | STP_STIPG_DG1 | TNK_STIFIN_STI | STP_STIPG_PNS | STP_STIPG_GDD |
|---|---|---|---|---|---|---|---|
| 0 (1) | 15.5 | 52.5 | 2 | 24.381696 | 157 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.370036 | 4.127793 |
| 3 (4) | 22.25 | 52.5 | 2 | 33.890625 | 157 | 3.116406 | 0.866027 |
| 4 (5) | 24.5 | 52.5 | 2 | 37.047595 | 154 | NaN | NaN |
| 5 (6) | 15.5 | 56.25 | 2 | 24.381696 | 167 | 11.971823 | 10.651568 |
| 6 (7) | 17.75 | 56.25 | 2 | 27.539265 | 164 | 8.582142 | 7.317429 |
| 7 (8) | 20 | 56.25 | 2 | 30.732833 | 160 | 5.269715 | 4.032957 |
| 8 (9) | 22.25 | 56.25 | 2 | 33.890625 | 157 | 2.013443 | 0.780521 |
| 9 (10) | 24.5 | 56.25 | 2 | 37.047595 | 153 | NaN | NaN |
| 10 (11) | 15.5 | 60 | 2 | 24.381696 | 167 | 11.795147 | 10.529056 |
| 11 (12) | 17.75 | 60 | 2 | 27.539265 | 163 | 8.481802 | 7.22371 |
| 12 (13) | 20 | 60 | 2 | 30.732833 | 160 | 5.165463 | 3.942212 |
| 13 (14) | 22.25 | 60 | 2 | 33.890625 | 157 | 1.894331 | NaN |
| 14 (15) | 24.5 | 60 | 2 | 37.047595 | 153 | NaN | NaN |
| 15 (16) | 15.5 | 63.75 | 2 | 24.381696 | 167 | 11.693668 | 10.415309 |
| 16 (17) | 17.75 | 63.75 | 2 | 27.539265 | 163 | 8.378459 | 7.159459 |

Regression Results

Figure 14G

| Metrology Target | VIA_CONTACT_AREA | | | |
|---|---|---|---|---|
| Name | P-Value | Weight | Relative Weight | Status |
| Intercept | < 0.001 | 1075 | | |
| {3.7.5:materials[/Oxides/].etchRatio} | 0.01701 | 23.34 | 2.647 | Significant |
| {3.7.5:materials[/Silicon/].etchRatio} | ns | 0 | 0 | Not Significant |
| {3.7.5:depth} | ns | 0 | 0 | Not Significant |
| {3.7.5:type.legacyBasic.lateralRatio} | < 0.001 | 1718 | 14.44 | Significant |
| {3.7.6.2:materials[/Metals/].lateralRatio} | ns | 0 | 0 | Not Significant |
| {3.7.5:materials[/Oxides/].etchRatio}^2 | ns | 0 | 0 | Removed - Highly Collinear |
| {3.7.5:materials[/Silicon/].etchRatio}^2 | ns | 0 | 0 | Removed - Highly Collinear |
| {3.7.5:depth}^2 | ns | 0 | 0 | Removed - Highly Collinear |
| {3.7.5:type.legacyBasic.lateralRatio}^2 | ns | 0 | 0 | Removed - Highly Collinear |
| {3.7.6.2:materials[/Metals/].lateralRatio}^2 | ns | 0 | 0 | Removed - Highly Collinear |
| {3.7.5:materials[/Oxides/].etchRatio}*{3.7.5:materials[/Silicon/].etchRatio} | < 0.001 | 1528 | 11.13 | Significant |
| {3.7.5:materials[/Oxides/].etchRatio}*{3.7.5:depth} | ns | 0 | 0 | Removed - Highly Collinear |
| {3.7.5:materials[/Oxides/].etchRatio}*{3.7.5:type.legacyBasic.lateralRatio} | ns | 0 | 0 | Removed - Highly Collinear |
| {3.7.5:materials[/Oxides/].etchRatio}*{3.7.6.2:materials[/Metals/].lateralRatio} | ns | 0 | 0 | Removed - Highly Collinear |
| {3.7.5:materials[/Silicon/].etchRatio}*{3.7.5:depth} | ns | 0 | 0 | Not Significant |
| {3.7.5:materials[/Silicon/].etchRatio}*{3.7.5:type.legacyBasic.lateralRatio} | ns | 0 | 0 | Not Significant |
| {3.7.5:materials[/Silicon/].etchRatio}*{3.7.6.2:materials[/Metals/].lateralRatio} | ns | 0 | 0 | Not Significant |
| {3.7.5:depth}*{3.7.5:type.legacyBasic.lateralRatio} | ns | 0 | 0 | Removed - Highly Collinear |
| {3.7.5:depth}*{3.7.6.2:materials[/Metals/].lateralRatio} | ns | 0 | 0 | Removed - Highly Collinear |
| {3.7.5:type.legacyBasic.lateralRatio}*{3.7.6.2:materials[/Metals/].lateralRatio} | ns | 0 | 0 | Not Significant |

1454

SYSTEM AND METHOD FOR PERFORMING PROCESS MODEL CALIBRATION IN A VIRTUAL SEMICONDUCTOR DEVICE FABRICATION ENVIRONMENT

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

BACKGROUND

Integrated circuits (ICs) implement a myriad of capabilities of modern electronic devices. To make the development of ICs more efficient, a semiconductor manufacturer will periodically develop a common fabrication process or "technology" to be used for production of its integrated circuits (for ease of explanation the term "technology" may be used herein to refer to a fabrication process for a semiconductor device structure that is being developed).

Semiconductor development organizations at integrated device manufacturers (IDMs) and independent foundries spend significant resources developing the integrated sequence of process operations used to fabricate the chips ((ICs) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive. Recent semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

Attempts have been made to use conventional mechanical computer-aided design (CAD) tools and specialized technology CAD (TCAD) tools to model semiconductor device structures, with the goal of reducing the efforts spent on fabricating experimental wafers. General-purpose mechanical CAD tools have been found inadequate because they do not automatically mimic the material addition, removal, and modification processes that occur in an actual fab. TCAD tools, on the other hand, are physics-based modeling platforms that simulate material composition changes that occur during diffusion and implant processes, but not all of the material addition and removal effects that occur during other processes that comprise an integrated process flow. Typically, the 3D device structure is an input to TCAD, not an output. Furthermore because of the amount of data and computations required for physics-based simulations of processes, TCAD simulations are practically restricted to very small regions on a chip, most often encompassing just a single transistor. In state-of-the-art semiconductor fabrication technologies, most of the integration challenge concerns the interaction between processes that may be widely separated in the integrated process flow and the multiple different devices and circuits that comprise a full technology suite (transistors, resistors, capacitors, memories, etc.). Structural failures, stemming from both systematic and random effects, are typically the limiter in time-to-market for a new process technology node. As such, a different modeling platform and approach than mechanical CAD or TCAD is required to cover the larger scope of concern, and to model the entire integrated process flow in a structurally predictive fashion.

A virtual fabrication environment for semiconductor device structures offers a platform for performing semiconductor process development at a lower cost and higher speed than is possible with conventional trial-and-error physical experimentation. In contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

BRIEF SUMMARY

Embodiments of the present invention provide a virtual fabrication environment for semiconductor device fabrication that includes an analytics module for identifying key parameters and for performing process model calibration and variability analysis. More particularly, for key parameter identification, the analytics module identifies process steps and/or parameters that most strongly influence an outcome of the fabrication process. In process model calibration, the analytics module adjusts the process parameters to make the 3D model being generated in the virtual fabrication environment match measurements from a physical fab such as Transmission Electron Microscopy (TEM) data or a process target. For variability analysis, the analytics module assists a user in analyzing and understanding the variability in metrology data obtained for a set of virtual 3D models generated in the virtual fabrication environment.

In one embodiment, a non-transitory computer-readable medium holds computer-executable instructions for key parameter identification in a virtual semiconductor fabrication environment. The instructions when executed cause at least one computing device to receive, for a semiconductor device structure to be virtually fabricated in a computing device-generated virtual fabrication environment, a selection of 2D design data and a process sequence that includes multiple processes. The instructions when executed further perform with the computing device virtual fabrication runs for the semiconductor device structure based on a Design of Experiment (DOE) using the 2D design data and the process sequence. The virtual fabrication runs build multiple 3D models. The instructions when executed also cause at least one computing device to receive a user identification of one or more targets for the semiconductor device structure and execute an analytics module in the virtual fabrication environment to identify one or more outliers in measurement data for the one or more targets in the 3D models produced from the virtual fabrication runs The instructions when executed further receive a user selection to add or remove one or more of the one or more identified outliers from the measurement data for the one or more targets in the 3D models, the selection received via a user interface provided in the virtual fabrication environment. The instructions when executed additionally performs a regression analysis on the measurement data for the one or more targets with the analytics module after the adding or removing of the selected outliers from the measurement data and identifies one or more key parameters with the analytics module based on a result of the regression analysis. An identification of the identified one or more key parameters is displayed or exported.

In another embodiment, a method for key parameter identification in a virtual semiconductor fabrication environment includes receiving, for a semiconductor device structure to be virtually fabricated in a computing device-generated virtual fabrication environment, a selection of 2D design data and a process sequence that includes multiple processes. The method further performs with the computing device virtual fabrication runs for the semiconductor device structure based on a Design of Experiment (DOE) using the 2D design data and the process sequence. The virtual fabrication runs build multiple 3D models. The method additionally receives a user identification of one or more targets for the semiconductor device structure and executes an analytics module in the virtual fabrication environment to identify one or more outliers in measurement data for the one or more targets in the 3D models produced from the virtual fabrication runs The method also receives a user selection to add or remove one or more of the one or more identified outliers from the measurement data for the one or more targets in the 3D models. The selection is received via a user interface provided in the virtual fabrication environment. Additionally the method performs a regression analysis on the measurement data for the one or more targets with the analytics module after the adding or removing of the selected outliers from the measurement data and identifies one or more key parameters with the analytics module based on a result of the regression analysis. An identification of the identified one or more key parameters is displayed or exported.

In one embodiment, a virtual fabrication system includes a computing device equipped with a processor and configured to generate a virtual fabrication environment that includes an analytics module. The virtual fabrication environment receives, for a semiconductor device structure to be virtually fabricated, a selection of 2D design data and a process sequence that includes multiple processes and performs virtual fabrication runs for the semiconductor device structure based on a Design of Experiment (DOE) using the 2D design data and the process sequence. The virtual fabrication runs build multiple 3D models. The virtual fabrication environment receives a user identification of one or more targets for the semiconductor device structure, executes the analytics module in the virtual fabrication environment to identify one or more outliers in measurement data for the one or more targets in the 3D models produced from the virtual fabrication runs and receives a user selection to add or remove one or more of the one or more identified outliers from the measurement data for the one or more targets in the 3D models, the selection received via a user interface provided in the virtual fabrication environment. The virtual fabrication environment performs a regression analysis on the measurement data for the one or more targets with the analytics module after the adding or removing of the selected outliers from the measurement data, identifies one or more key parameters with the analytics module based on a result of the regression analysis, and displays or exports an identification of the identified one or more key parameters. The virtual fabrication system further includes a display surface in communication with the computing device. The display surface is configured to display the 3D structural model in a 3D view.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 11 depicts an exemplary tabular-formatted display of virtual metrology data generated in a virtual experiment in the virtual fabrication environment;

FIGS. 14A-14G depict exemplary user interfaces provided by a virtual fabrication environment while identifying key parameters in an exemplary embodiment;

DETAILED DESCRIPTION

Embodiments of the present invention provide a virtual fabrication environment for semiconductor device fabrication that includes an analytics module for identifying key parameters and for performing process model calibration and variability analysis. However, prior to discussing the key parameter identification, process model calibration, optimization, variability analysis and other features provided by embodiments, an exemplary 3D design environment/virtual fabrication environment into which an analytics module of the present invention may be integrated is first described.

Exemplary Virtual Fabrication Environment

Figure 1:
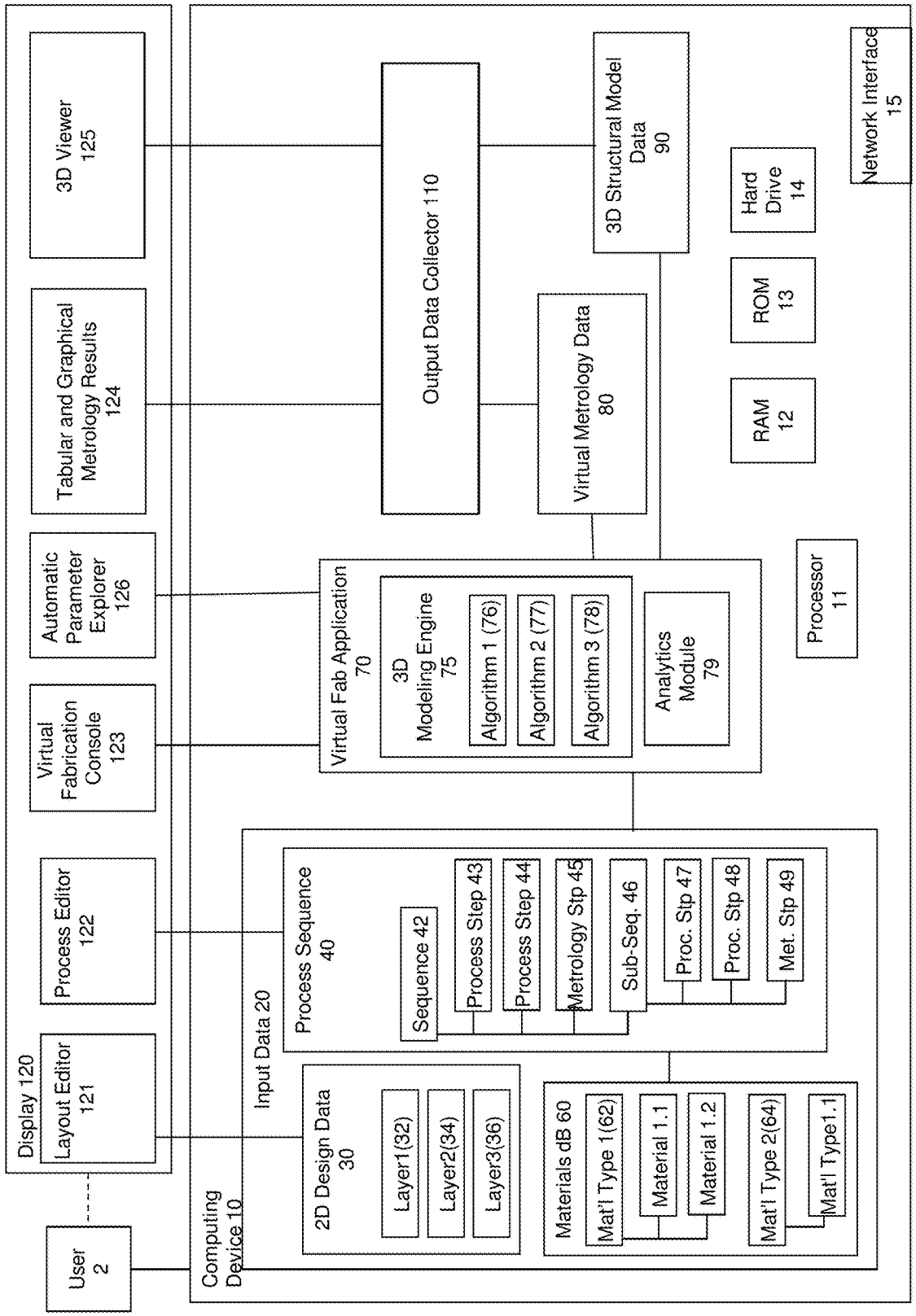
FIG. 1 depicts an exemplary virtual fabrication environment suitable for practicing an embodiment of the present invention.

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with one or more processors 11 and able to support the operations of virtual fabrication application, 70, 3D modeling engine 75 and analytics module 79 (described further below). The processor(s) may have one or more cores. The computing device 10 may also include volatile and non-volatile storage such as, but not limited to, Random Access Memory (RAM) 12, Read Only Memory (ROM) 13 and hard drive 14. Computing device 10 may also be equipped with a network interface 15 so as to enable communication with other computing devices. It will be appreciated that computing device 10 rather than being a solitary computing device may also be implemented as a computing system with multiple computing devices working in parallel or other combination.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures. Virtual fabrication application 70 may also include analytics module 79 for performing analysis of 3D models as discussed further below.

Input data 20 includes both 2D design data 30 and process sequence 40. Process sequence 40 may be composed of multiple process steps 43, 44, 47, 48 and 49. As described further herein, process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. Alternatively, the measurement location may be specified by alternate means such as (x, y) coordinates in the 2D design data or some other means of specifying a location in the 2D design data 30 instead of through the use of a locator shape. The performance of the process sequence 40 during a virtual fabrication run generates virtual metrology data 80 and 3D structural model data 90. 3D structural model data 90 may be used to generate a 3D view of the structural model of the semiconductor device structure which may be displayed in the 3D viewer 125. Virtual metrology data 80 may be processed and presented to a user 2 in the tabular and graphical metrology results view 124.

Because of the large number of structural dimensions that are critical to the success of an integrated technology such as semiconductor devices, finding the relationship between the many inter-related process steps used to fabricate a device structure and the created structure is critical. As structural modifications produced by a step in the process sequence may be affected by previous and subsequent steps in the sequence, a particular step may affect a structural dimension in ways that are not obvious. A virtual fabrication environment enables automatic extraction of structural measurements from the device being created. The automatic extraction of a measurement is accomplished by specifying a virtual metrology measurement step in the process sequence at a point in the process when the measurement is critical. A locator shape for this virtual metrology measurement can be added to a layer in the design data and specified by the virtual metrology measurement step. The output data from this virtual metrology measurement can be used to provide quantitative comparison to other modeling results or to physical metrology measurements. This virtual metrology measurement capability is provided by during the processing sequence to extract a critical physical dimension at the correct point in the integrated process flow.

The ability to provide virtual metrology measurement data at specified locations in the device structure provides a significant improvement over conventional physical fab measuring techniques. Typically, physical in-fab measurements are done on specific characterization structures fabricated in the scribe lines or saw kerfs, adjacent to the product dice. In most cases, these characterization structures need to be designed to accommodate limitations of the measurement technique, such as optical spot size. Therefore, the characterization structures are not entirely representative of the actual structures on the product dice. Because of these differences, users of in-fab measurements usually face the challenge of inferring the result on the product structure from a measurement on a characterization structure. In the virtual fabrication environment, measurements can be added to any design layout at specified points in the process sequence thus providing greater insight into the effect of the inter-related process steps on the virtual structural model being constructed. As such, the in-fab challenge of measuring a characterization structure and inferring the result on a product structure is eliminated.

Figure 2:
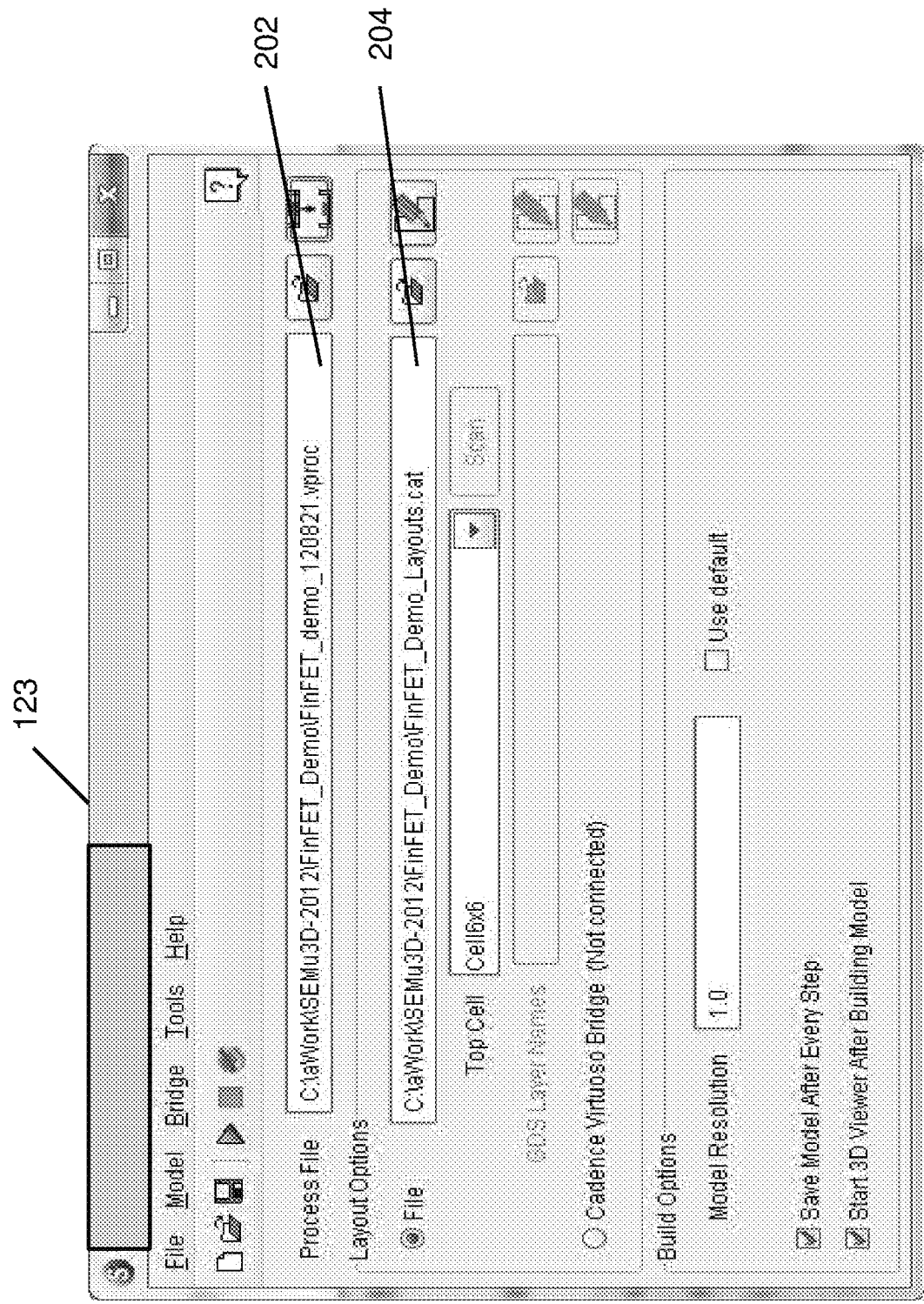
FIG. 2 depicts an exemplary virtual fabrication console in the virtual fabrication environment.

FIG. 2 depicts an exemplary virtual fabrication console 123 to set up a virtual fabrication run in the virtual fabrication environment. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
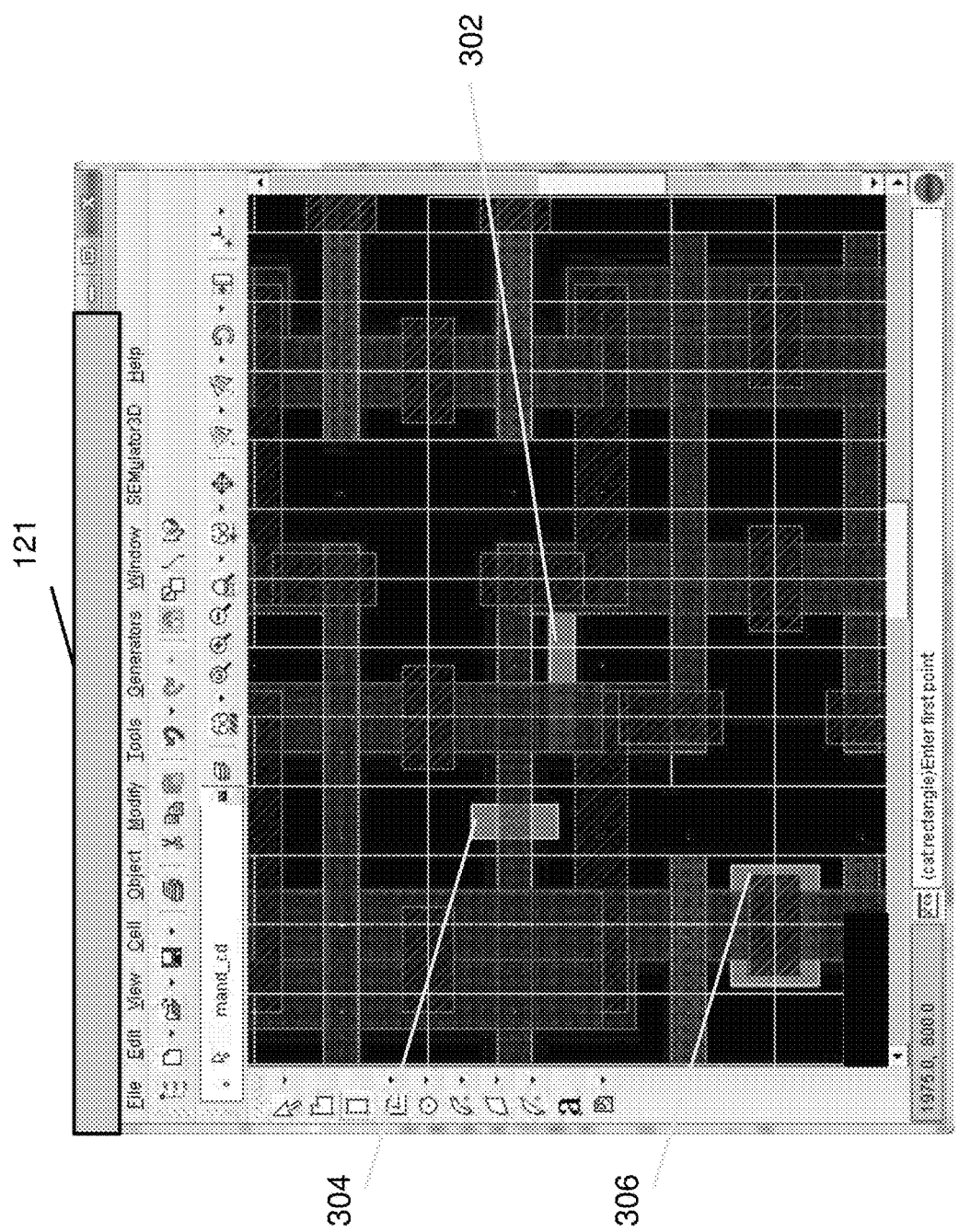
FIG. 3 depicts an exemplary layout editor in the virtual fabrication environment.

FIG. 3 depicts an exemplary layout editor in the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes may also be employed in the virtual fabrication environment. The design data is used in combination with the process data and materials database to build a 3D structural model.

Figure 4:
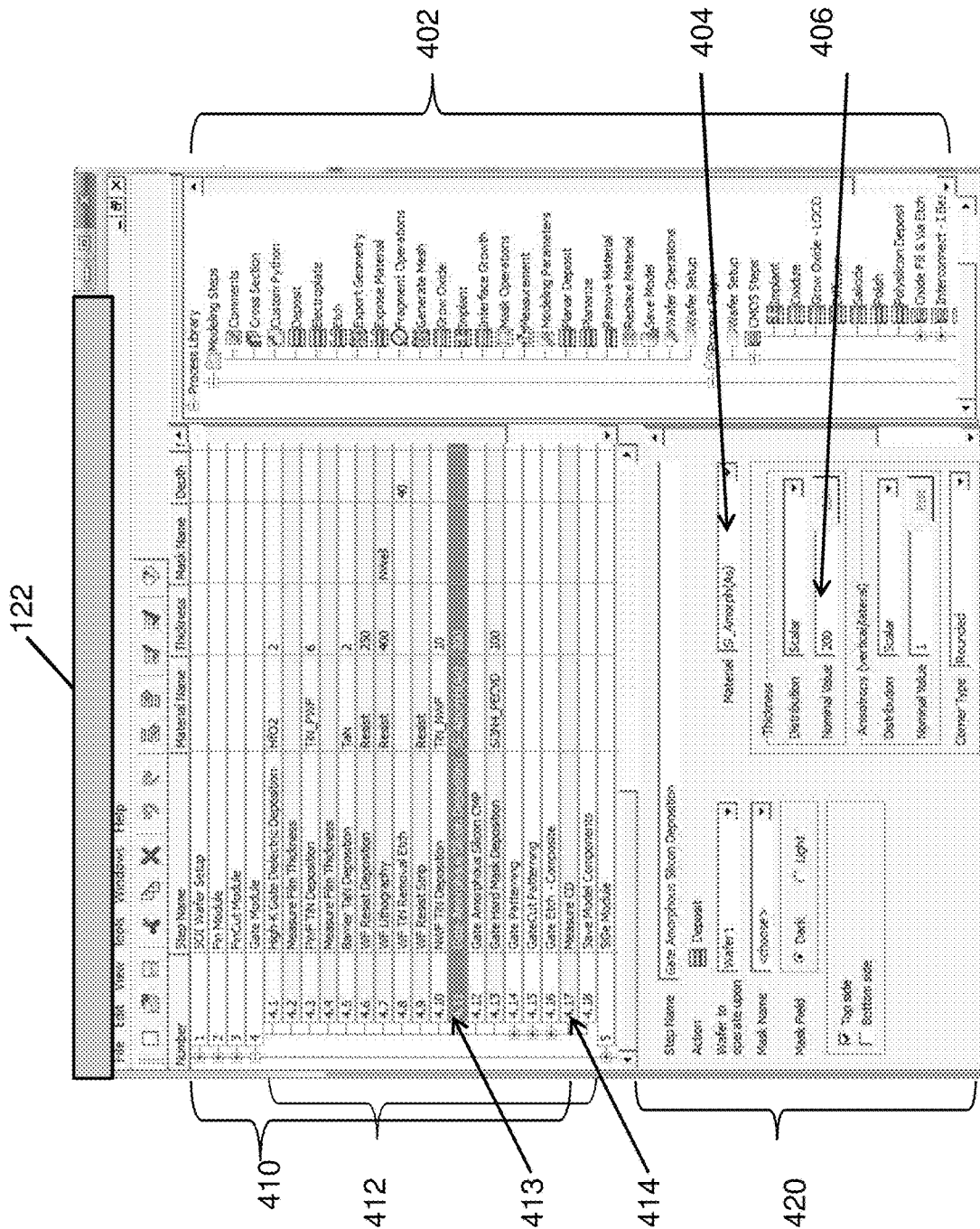
FIG. 4 depicts an exemplary process editor in the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 in the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. Inserting the virtual metrology steps directly in the fabrication sequence allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
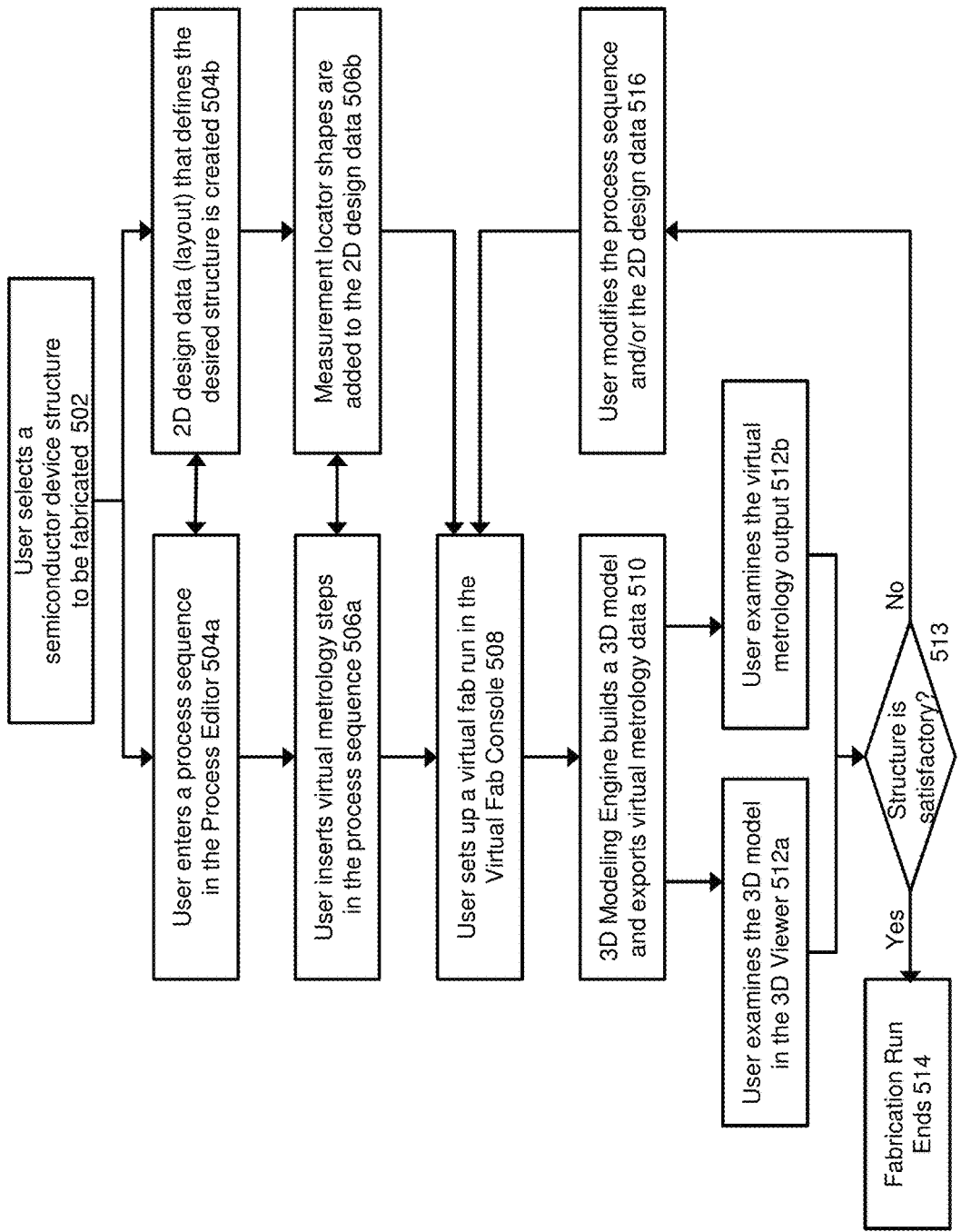
FIG. 5 depicts an exemplary sequence of steps in the virtual fabrication environment to generate virtual metrology measurement data.

FIG. 5 depicts an exemplary sequence of steps in the virtual fabrication environment to generate virtual metrology measurement data. The sequence begins with a user selecting a semiconductor device structure to be fabricated (step 502). The user may select from among multiple available sets of design data files and then select a rectangular region within the design data. For example the user may choose a FinFET or a passive resistor or a memory cell. Following the determination/selection of the structure to be fabricated, the user enters a process sequence in the process editor 122 (step 504a) and selects 2D design data that is expected to result in the desired structure (step 504b). Optionally, the user may create or modify design data in the layout editor 121. In the process editor, the user may insert one or more virtual metrology steps in the process sequence that specify a point during the virtual fabrication that the user would like virtual metrology measurements to be taken at specified locations in the evolving structure (step 506a). The user may insert locator shapes in the 2D design data displayed in the layout editor 121 that will be used by the virtual metrology step to perform its measurements (step 506b). The significance of a locator shape depends on the type of measurement requested. For example, the longer axis of a rectangular shape may indicate the direction and extent of a length measurement to be taken on a cross section of the structure, or the rectangle itself may designate a region where the contact area between two materials is to be measured. It will be appreciated that both above-described steps in the process editor may be performed before the steps in the layout editor or vice-versa in the virtual fabrication environment.

After the one or more locator shapes have been added to one or more layers in the 2D design data (step 506b) and the virtual metrology step(s) have been added to the process sequence (506a) the user sets up a virtual fabrication run using the virtual fabrication console 123 (step (508)). During the virtual fabrication run, the process steps in the process sequence 40 are performed in the order specified by the 3D modeling engine 75. When the virtual fabrication reaches the virtual metrology step, a virtual "measurement" of the specified component in the structure being fabricated is performed. The computations done by the modeling engine depend on the nature of the measurement being requested, and are generally consistent with the analogous physical measurement technique in the fab. For example, critical dimension scanning electron microscope (CD-SEM) measurements in the fab locate sidewalls by detecting rapid changes in the orientation of the top surface of a structure. Similarly in a virtual metrology operation, the 3D modeling engine extracts the top surface of the structure in the region specified by a locator rectangle, interrogates the surface along its intersection with a plane defined by the intersection of the longer axis of the rectangle and the vertical axis for changes in slope that exceed a threshold (5 degrees, for example). Large changes in slope define faces of a feature, such as the bottom, top and sides of a ridge in the structure. Having established the locations of bottom, top and sides of a feature, the distance between the sides of the feature is computed at a vertical location (bottom, middle, or top) specified by the metrology step. The 3D modeling engine generates one or more types of output as it builds structural models. One type of output is the structural model itself, and may include its state at one or more points in the process sequence. The 3D model may be displayed to a user in the 3D viewer 125 (step 512a). The 3D modeling engine also exports the virtual metrology data (step 510). The virtual metrology data 80 may be exported to an automatic data analysis tool for further processing or may be displayed to a user through a user interface such as the tabular and graphical metrology results view 124 or other view (step 512b). If the structure when viewed or analyzed is satisfactory (step 513), the virtual fabrication run ends (step 514). If the structure created by the 3D modeling engine is unsatisfactory, the user modifies the process sequence and/or the 2D design data (step 516) and a new virtual fabrication run is set up (step 508).

Figure 6:
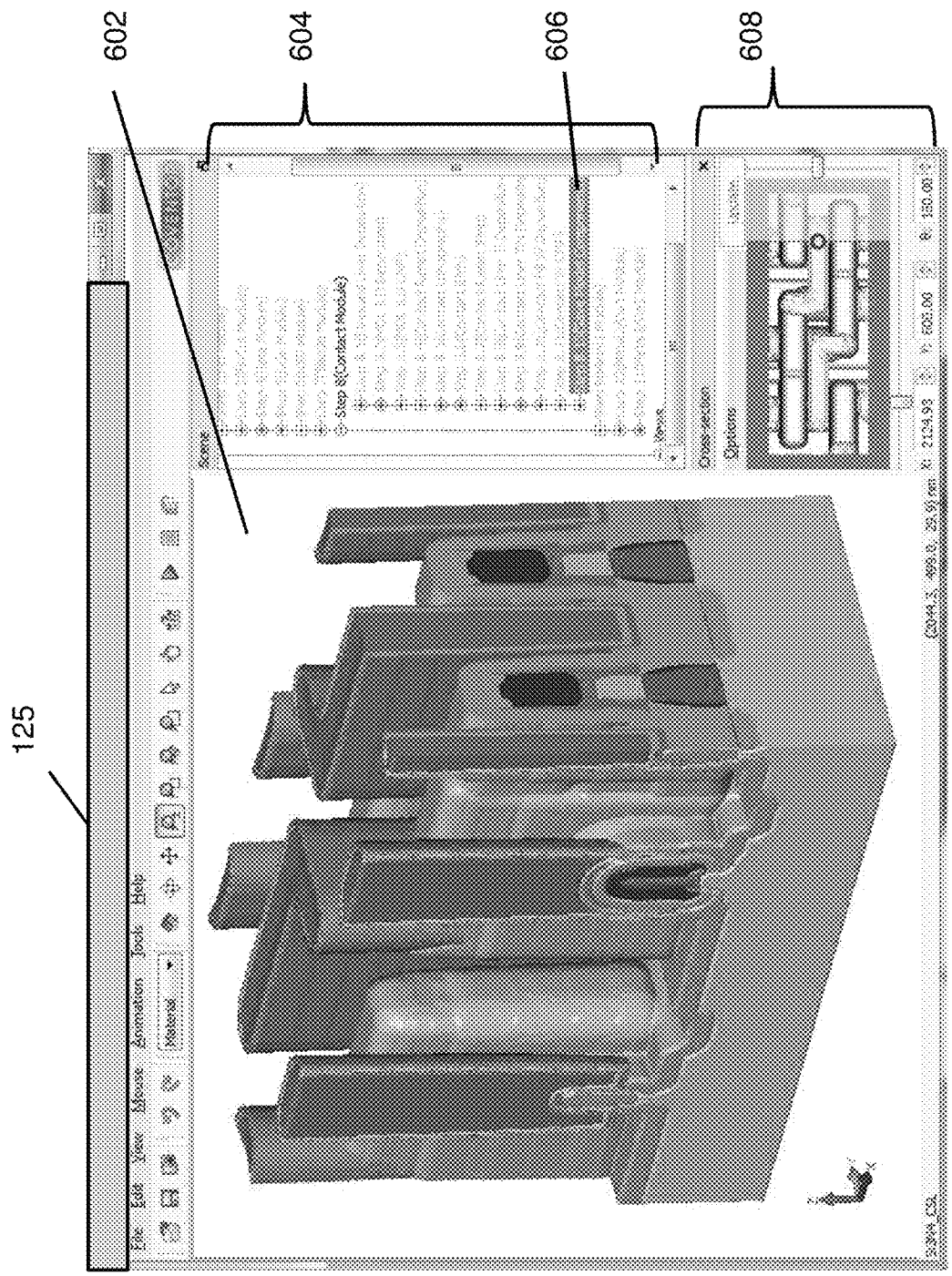
FIG. 6 depicts an exemplary 3D viewer in the virtual fabrication environment.

FIG. 6 depicts an exemplary 3D viewer 125 in the virtual fabrication environment. The 3D viewer 75 may include a 3D view canvas 602 for displaying 3D models generated by the 3D modeling engine 75. The 3D viewer 75 may display saved states 604 in the process sequence and allow a particular state to be selected 606 and appear in the 3D view canvas. The 3D Viewer provides functionality such as zoom in/out, rotation, translation, cross section, etc. Optionally, the user may activate a cross section view in the 3D view canvas 602 and manipulate the location of the cross section using a miniature top view 608.

Figure 7:
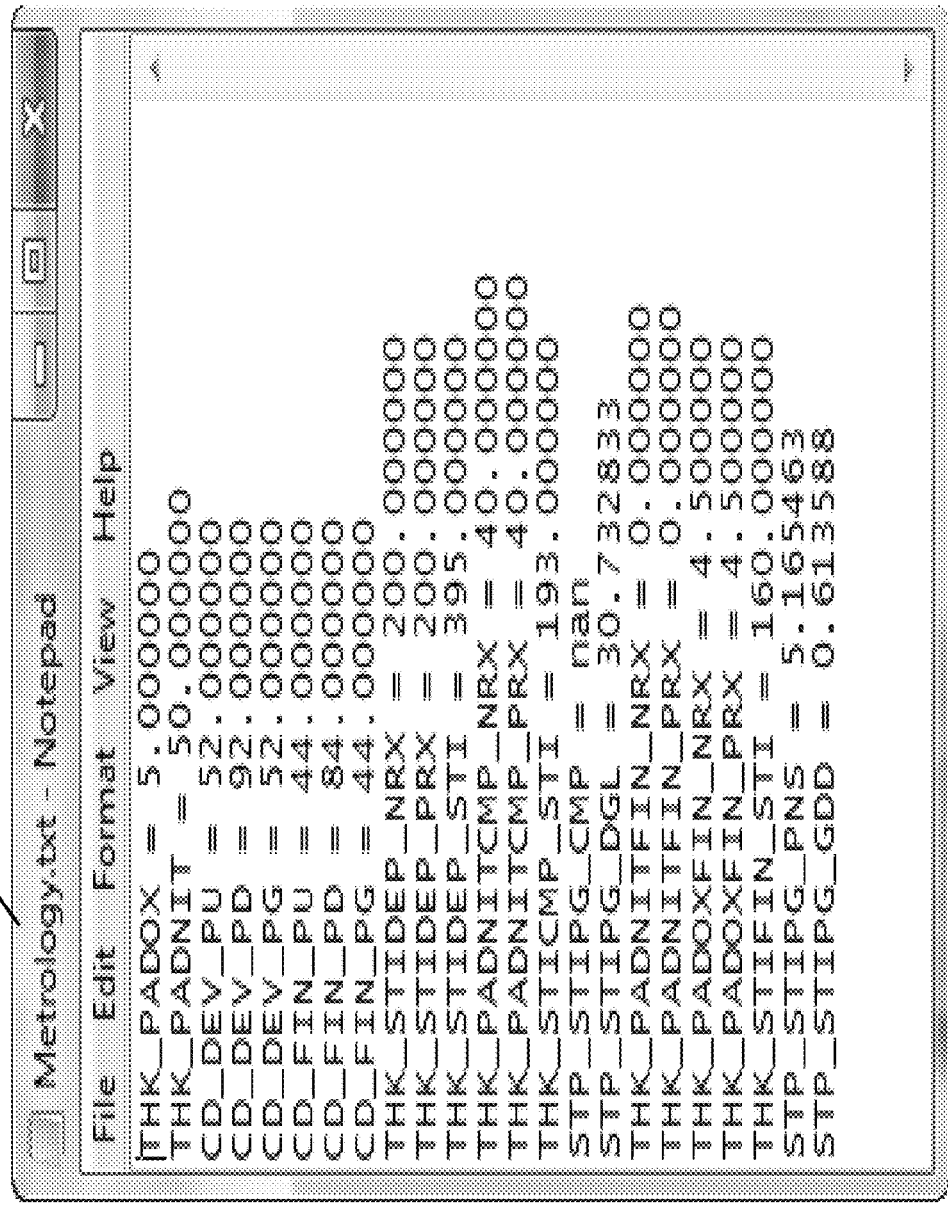
FIG. 7 depicts an exemplary display of virtual metrology measurement data in the virtual fabrication environment.

Another type of output from the 3D modeling engine 75 is the data produced by virtual metrology steps that are included in the process sequence. FIG. 7 depicts an exemplary display of virtual metrology measurement data 80 generated by multiple virtual metrology measurement steps in the virtual fabrication environment. The virtual metrology measurement result data 80 may be displayed in a tabular or graphical form including 2D X-Y plots and multi-dimensional graphics.

The techniques employed in the exemplary virtual fabrication environment are geometry-based. Calibration of the process step input parameters with actual experimental results from a physical fabrication to make virtual experiments more predictive is therefore advisable. Such calibration of the process steps results in improved modeling accuracy for all structures that comprise the full technology suite. Calibration can be executed on individual process steps from measurements, metrology or other physical characterization methods on characterization structures or product structures. Calibration may be conducted by comparing modeling results, including virtual metrology measurement data, to corresponding measurements or metrology conducted in the physical fab (on corresponding characterization or product structures), and subsequently adjusting modeling parameters such that the resulting virtually fabricated structures better match the physically fabricated structures. With proper calibration of modeling process parameters, the virtual fabrication environment becomes more predictive of the structures that result from physical fabrication throughout the entire allowed design space.

Figure 8:
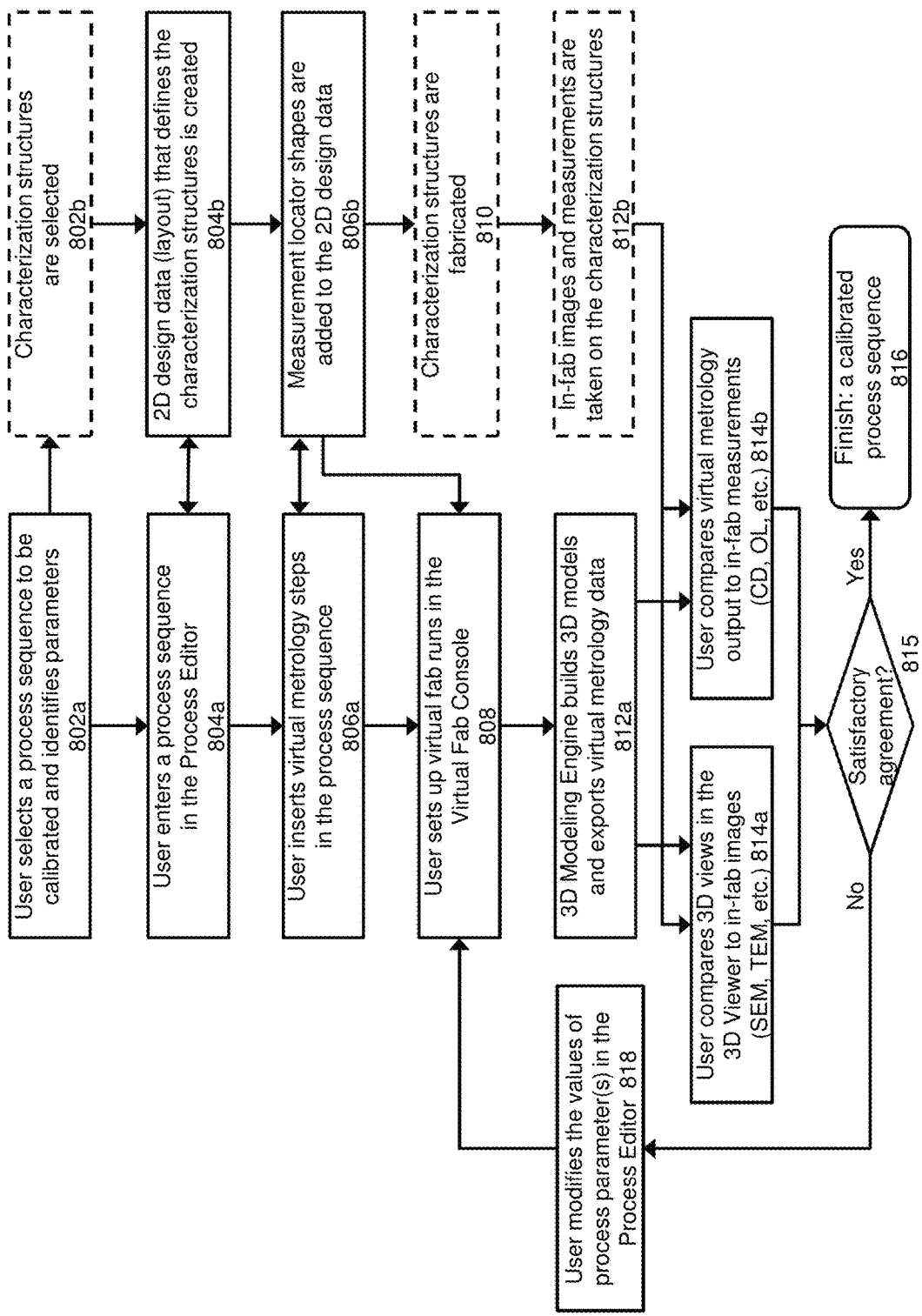
FIG. 8 depicts an exemplary sequence of steps in the virtual fabrication environment to calibrate a process sequence in a virtual fabrication environment.

FIG. 8 depicts an exemplary sequence of steps to calibrate a process sequence in a virtual fabrication environment. The sequence includes steps taken in both a virtual fabrication environment and a corresponding physical fab environment. In the virtual fabrication environment, the user selects a process sequence (for a structure to be virtually fabricated) to be calibrated and identifies related process parameters (step 802a). In the physical fab the user identifies a set of characterization or product structures for measurement during a fabrication run (step 802b). Back in the virtual fabrication environment the user enters the process sequence in the process editor (step 804a) and the 2D design data (layout) that defines the characterization structures is selected from available 2D design data or created for the purpose in the layout editor 121 (step 804b) The same design data is used for virtual fabrication and actual characterization. As discussed above, the user inserts one or more virtual metrology steps in the process sequence (step 806a) and adds measurement locator shapes to the 2D design data (step 806b). The user sets up a virtual fab run in the virtual fabrication console (step 808) and the 3D modeling engine builds the 3D model, and generates and exports virtual metrology data (step 812a). In parallel or offset with the virtual fabrication run, the physical fabrication environment creates the characterization or product structures (step 810) and in-fab images and measurements are taken on these structures (step 812b). The user may then compare the 3D views of the generated virtual model in the 3D viewer 75 to the in-fab images of the physical device structure (step 814a). Further, the set of characterization structure measurements may be compared to the virtual metrology measurements taken as a result of the virtual metrology step being inserted into the process sequence (step 814b). In most cases, this comparison will be made by the user, but alternatively the comparison may be made by an automated data analysis tool based on pre-defined or interactively solicited criteria. If there is satisfactory agreement between the views and images and the virtual and actual measurements (step 815), the process sequence is considered calibrated (step 816). However, if there is not satisfactory agreement (step 815), the user modifies the values of the process parameters in the process editor (step 818) and a new virtual fabrication run is set up in the virtual fabrication console (step 808). The sequence then iterates until a satisfactory agreement is reached and calibration is achieved.

It should be appreciated that there may be a number of different parameters that may be calibrated within the sequence. Although the above description notes the use of the insertion of virtual metrology steps in the process sequence and the related use of the 2D locator shape or shapes to conduct the virtual metrology measurements, other techniques could be employed in the in a virtual fabrication environment. For example, the virtual measurements could be conducted on a virtual device structure after fabrication is completed and then compared to the physical measurements taken of the characterization structures during/after the physical fabrication run.

While building a single structural model can be valuable, there is increased value in virtual fabrication that builds a large number of models. A virtual fabrication environment may enable a user to create and run a virtual experiment. In a virtual experiment, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability may be used to mimic two fundamental types of experiments that are typically performed in the physical fab environment. Firstly, fabrication processes vary naturally in a stochastic (non-deterministic) fashion. As explained herein, a fundamentally deterministic approach used for each virtual fabrication run nevertheless can predict non-deterministic results by conducting multiple runs. A virtual experiment mode allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment in the virtual fabrication environment can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 9:
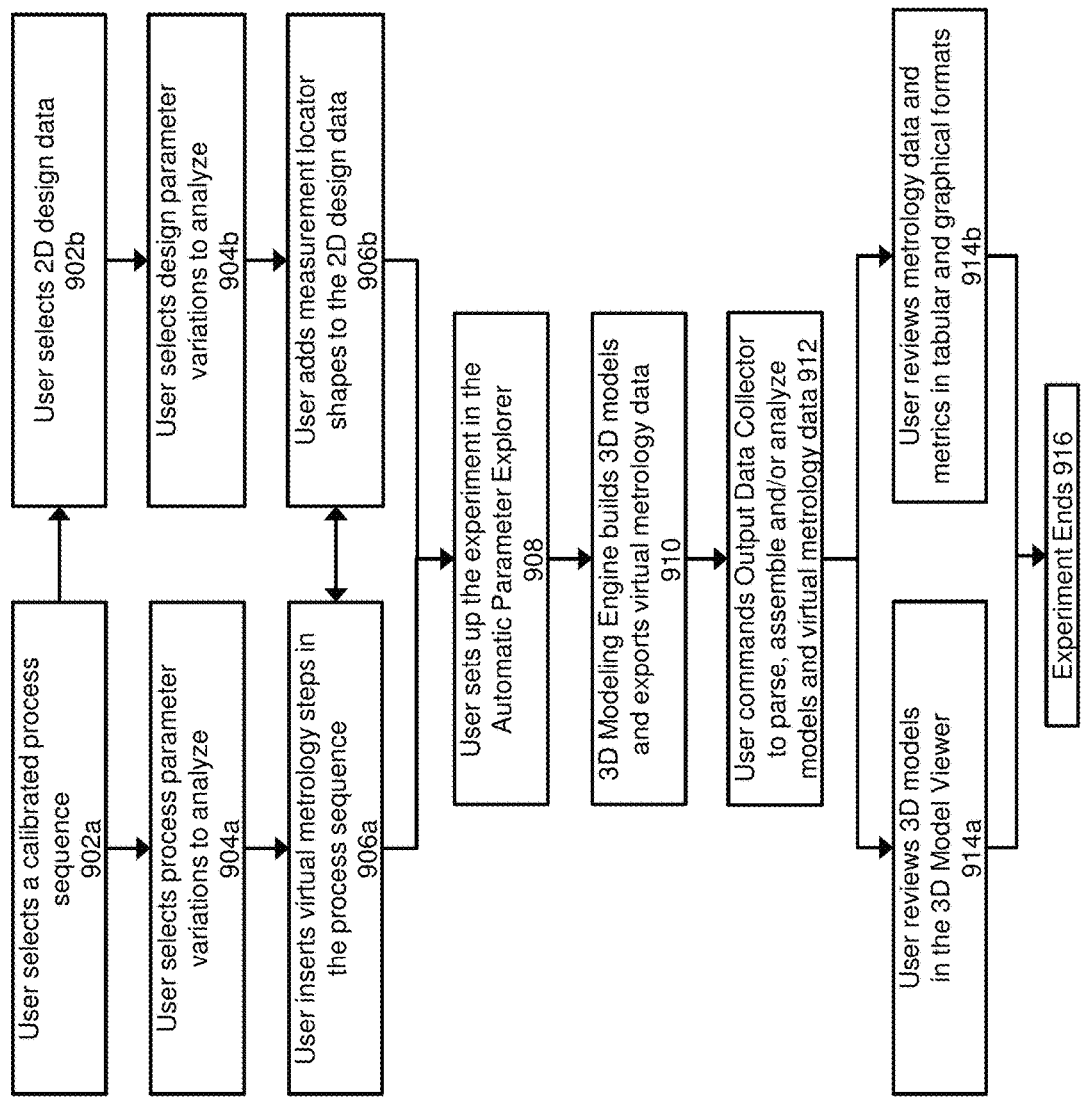
FIG. 9 depicts an exemplary sequence of steps to set up and perform a virtual experiment generating virtual metrology measurement data for multiple semiconductor device structure models in the virtual fabrication environment.
Figure 10:
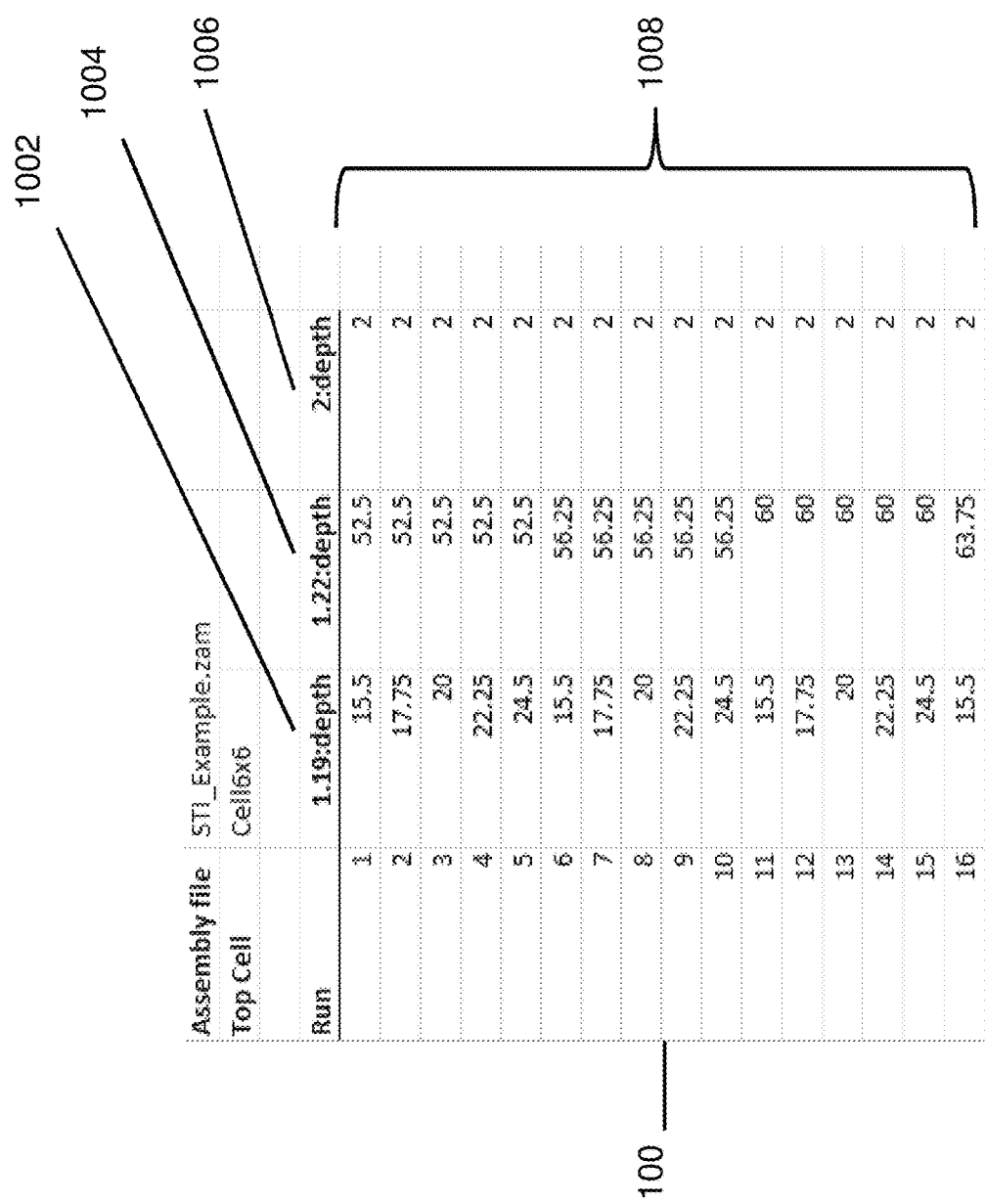
FIG. 10 depicts an exemplary parameter explorer view used to provide process parameters for a virtual experiment in the virtual fabrication environment.

FIG. 9 depicts an exemplary sequence of steps in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 902a) and identifying/creating 2D design data (step 902b). The user may select process parameter variations to analyze (step 904a) and/or design parameter variations to analyze (step 904b). The user inserts one or more virtual metrology steps in the process sequence as set forth above (step 906a) and adds measurement locator shapes to the 2D design data (step 906b). The user may set up the virtual experiment with the aid of a specialized user interface, an automatic parameter explorer 126 (step 908). An exemplary automatic parameter explorer is depicted in FIG. 10 and may display, and allow the user to vary, the process parameters to be varied 1002, 1004, 1006 and the list of 3D models to be built with their corresponding different parameter values 1008. The parameter ranges for a virtual experiment can be specified in a tabular format. The 3D modeling engine 75 builds the 3D models and exports the virtual metrology measurement data for review (step 910). The virtual experiment mode provides output data handling from all Virtual Measurement/Metrology operations. The output data from the virtual metrology measurements may be parsed and assembled into a useful form (step 912).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 11 depicts an exemplary tabular-formatted display of virtual metrology data generated by a virtual experiment in the virtual fabrication environment. In the tabular formatted display, the virtual metrology data collected during the virtual experiment 1102 and the list of virtual fabrication runs 1104 may be displayed.

Figure 12:
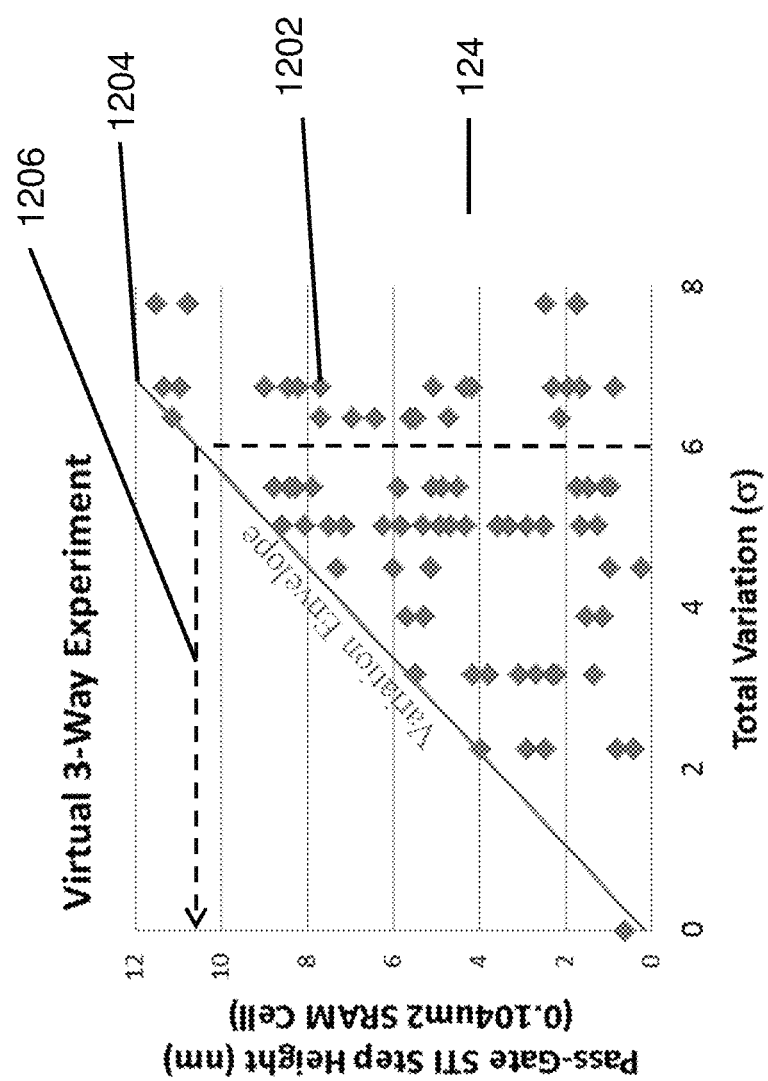
FIG. 12 depicts an exemplary graphical display of virtual metrology data generated in a virtual experiment in the virtual fabrication environment.

FIG. 12 depicts an exemplary 2D X-Y graphical plot display of virtual metrology data generated by a virtual experiment in the virtual fabrication environment. In the example depicted in FIG. 10, the total variation in shallow trench isolation (STI) step height due to varying 3 parameters in preceding steps of the process sequence is shown. Each diamond 1202 represents a virtual fabrication run. The variation envelope 1204 is also displayed as is the depicted conclusion 1206 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 914a) and review the virtual metrology measurement data and metrics presented for each virtual fabrication run (step 914b). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 75 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 uses multiple cores and/or processors to perform individual modeling steps. In addition, the structural models for different parameter values in a set are completely independent and can therefore be built in parallel using multiple cores, multiple processors, or multiple systems.

The 3D modeling engine 75 in the virtual fabrication environment may represent the underlying structural model in the form of voxels. Voxels are essentially 3D pixels. Each voxel is a cube of the same size, and may contain one or more materials, or no materials. Those skilled in the art will recognize that the 3D modeling engine 75 may also represent the structural model in other formats. For instance, the 3D modeling engine could use a conventional NURBS-based solid modeling kernel such as is used in 3D mechanical CAD tools, although modeling operations based on a digital voxel representation are far more robust than the corresponding operations in a conventional analog solid modeling kernel. Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

The virtual fabrication environment may enable the performance of a multi-etch process that is included in the process sequence which allows the 3D modeling engine 75 to model a wide-range of process and material-specific etch behavior. Patterning operations in process flows for highly scaled semiconductor devices are frequently performed using plasma etches. Plasma etches are known by many different names: dry etch, reactive ion etch (RIE), inductively coupled plasma (ICP) etch, etc. A wide variety of operating conditions and chemistry allows process engineers to fine-tune plasma etch behavior to selectively achieve diverse etch physics in multiple different classes of materials. This behavioral flexibility is key to achieving a desired 3D structure when patterning through several layers of material. Several different types of physics are typically involved, including but not limited to: chemical etching, sputtering, deposition or re-deposition of polymeric material, electrostatic charging, electrostatic focusing, and shadowing. This diverse spectrum of physics produces a commensurate range of etch behavior and hence structural shapes.

Directly simulating the physics involved in plasma etches with sufficient accuracy is extremely difficult and slow. The multi-etch process step avoids the difficulties of physics-based simulations by simulating plasma etches using a reduced set of behavioral parameters that are specific to the type of etch and the material being etched. This allows the capture of a wide range of physical etch behavior without the need to directly simulate the physics of the etch process. For example, three main types of etch behavior may be simulated: isotropic, taper, and sputtering. A fourth type of etch behavior, shadowing, can optionally also be simulated.

Basic (isotropic) behavior is caused (physically) by chemical etching and results in material being removed at a similar rate in all directions from the point on the etchable surface, regardless of the local orientation of the etchable surface. Basic behavior may be modeled with a single input parameter, "lateral ratio", that controls the ratio between the lateral and vertical etch rates. For example, a lateral ratio value of one (1.0) indicates that the etch rate is uniform in all directions. A lateral ratio value less than one indicates that the etch rate in the lateral direction (on vertical surfaces) is slower than the etch rate in the vertical direction (on horizontal surfaces).

Taper behavior is caused (physically) by a combination of directional etch behavior and polymer deposition. The polymer deposition occurs as a side effect of a directional etch process. During a directional etch process that etches horizontal surfaces much faster than vertical surfaces, polymer may accumulate on near-vertical surfaces. This competition between etching and deposition results in tapered sidewall profiles. Taper behavior may be modeled with a single input parameter, the taper angle. A taper angle describes the critical angle at which deposition and etch rates are balanced. An optional second parameter, the lateral ratio, has the same meaning as defined above for basic behavior.

Sputter behavior refers to direct physical removal of material through bombardment by energetic ions and results in preferential removal of protruding edges (convex edges) and in some cases corners. Sputtering may be modeled with two parameters: the angle of maximum sputter yield, and the rate of sputter relative to the rate of vertical etching.

Shadowing refers to a reduction in directional ion flux caused by a local elevation change, effectively reducing etch rates for some structures. This effect can be significant in some cases, resulting in differing etch rates across a cell. Shadowing may be modeled using a single parameter to describe angle of incidence of the energetic ions relative to a vertical axis.

To model a multi-material, multi-physics etch, the input parameters described above must be formed into a suitable numerical modeling algorithm in the virtual fabrication environment. The numerical modeling algorithm includes single material and multi-material speed functions and a surface evolution technique. A single-material speed function defines the etch speed as a function of local surface orientation (i.e., surface normal direction) and is determined empirically in order to produce the desired etch behavior. Note also that a single-material speed function may combine multiple types of etch behavior; for example, both taper and sputter etching include the parameters associated with basic (isotropic) etching. A multi-material speed function is a combination of single-material speed functions, and calculates the local etch speed as a function of both local surface orientation and local material type. The Etch Ratio parameter defines the relative etch rates of etchable materials and is a multiplication factor on the single-material speed.

With the speed function defined, a suitable surface evolution technique may be used to locate and evolve the position of the etchable surface in three dimensions. The etchable surface is advected or moved in its local normal direction according to the local scalar speed determined by evaluating the speed function. The scalar speed must be calculated at points of interest on the etchable surface and must be periodically re-calculated as the geometry of the etchable surface evolves.

A number of different types of surface evolution techniques may be utilized by the numerical algorithm for simulating the multi-etch process in the virtual fabrication environment. The moving surface may be represented using any suitable numerical spatial discretization. Explicit front tracking methods may be used: examples include string methods, point-and-line methods (2D) and polygon surfaces (3D). An alternate implicit surface representation, such as distance fields, volume of fluid or voxels, may also be used. Any suitable time-dependent numerical technique may be used to advance the moving surface in time.

A selective epitaxy process may be included in a process sequence used to virtually fabricate a semiconductor device structure. The selective epitaxy process virtually models epitaxial growth of a crystalline material layer on top of a crystalline substrate surface of a semiconductor device structure. Selective epitaxy is widely used in contemporary semiconductor process flows, often for the purpose of imparting mechanical stress on the transistor channel to improve performance. A key characteristic of epitaxial growth is its dependence on crystal directions. Semiconductor devices are normally fabricated on single crystal silicon wafers; i.e., silicon material with atoms arranged in a repetitive crystal lattice structure that is continuous over the majority of the wafer. Silicon crystal structure is anisotropic (i.e., not symmetric in all directions), and silicon surfaces are more stable in several particular crystal directions. These directions are defined by the major crystal plane families, identified as <100>, <110> and <111> using their Miller indices, and have the strongest impact on growth characteristics. By varying the pressure, temperature and chemical precursors in the epitaxy process, engineers can control the relative growth rates of the three major planes. Growth rates on minor planes, for example <211>, <311>, <411>, also vary but often are not influential in determining the final shape of an epitaxially grown structure.

The virtual fabrication environment may use a surface evolution algorithm to model epitaxial growth. The surface upon which epitaxial growth is occurring (the growing surface) is advected or moved according to a scalar advection speed. The growth rate is calculated at selected points based on the local surface normal direction and fixed input parameters, is local in both distance and time, and moves the surface in its normal direction. The growing surface may be represented using any suitable numerical spatial discretization. Explicit front tracking methods may be used: examples include string methods, point-and-line methods (2D) and polygon surfaces (3D). An alternate implicit surface representation, such as distance functions, volume of fluid or voxels, may also be used. Any suitable time-dependent numerical technique may be used to advance the growing surface in time.

The selective epitaxy process in the virtual fabrication environment utilizes the growth rates of the three major plane families, <100>, <110> and <111> as fixed input parameters. These input parameters define the growth rate for surfaces that are aligned with any one of their associated planes. Further input parameters may include growth rates on neighboring non-crystalline materials. The relationship between the 3D modeling coordinate system and the crystal lattice of the wafer may also be considered when calculating the epitaxial growth rate. The 3D modeling coordinate system normally uses the same X and Y axes as the 2D design data and the Z axis is normally perpendicular to the surface of the wafer. Alternate coordinate systems may also be employed. On a real wafer, the orientation of the crystal lattice is indicated by a "flat" or "notch" on the edge of the otherwise circular wafer. The notch may be used as a reference to orient the 2D design data in the desired direction relative to the crystal lattice. Input parameters specifying the notch (or flat) type and direction may define the orientation of the crystal lattice and associated crystal planes of the wafer relative to the 2D design data. It should be noted that this relationship can be described as a coordinate transformation between the 3D model coordinate system and the coordinate system of the crystal lattice.

Using the growth rates for the major plane families and knowing the orientation of the crystal lattice, the epitaxial growth rate may be calculated everywhere on the growing surface. Areas of the growing surface with a normal direction that is aligned with a major plane direction are assigned the speed of that major plane. For areas of the growing surface that are not aligned with a major plane direction, an appropriate speed must be found by interpolating between neighboring major plane directions. Further, the behavior of the epitaxial growth at the boundaries of the crystalline material can also be important. Epitaxial growth is often performed after several prior processing steps in which non-crystalline materials have been deposited and patterned. These non-crystalline materials may be adjacent to crystalline material and hence in close proximity to epitaxial growth. Examples of non-crystalline neighboring materials are silicon dioxide, silicon nitride, or any other materials common in semiconductor processing. In some cases, epitaxial growth slowly creeps along adjacent non-crystalline material (overgrowth) but in other cases it does not. Overgrowth behavior may be modeled with fixed input parameters defining the set of neighboring materials on which overgrowth occurs (overgrowth materials), as well as the speed at which the growing surface creeps along the overgrowth materials. The overgrowth speed modifies the epitaxial growth rate at the surface of the overgrowth materials such that the growing surface moves along the overgrowth material at the specified speed. In addition, the speed at which the growing surface moves along the overgrowth material may depend on the angle between the overgrowth material surface and the growing surface. The overgrowth speed may be ignored if the angle between the two surfaces is greater than a threshold angle.

Design Rule Checks (DRCs) or Optical Rule Checks (ORCs) may be performed in the virtual fabrication environment. DRCs and ORCs have typically been performed by specialized software on 2D design data as part of the process of preparing 2D design data for conversion into photolithography masks. Such checks are performed for purposes of identifying errors in the layout that would result in non-functional or poorly functioning chips. The checks are also performed after adding compensations for optical effects such as optical proximity correction (OPC). Typical design rules (as published in design manuals and coded in DRC decks) are simple 2D criteria intended to prevent problems that are fundamentally 3D in nature. However, with the growing complexity of semiconductor process technology, design manuals have blossomed into thousand-page documents with thousands of 2D design rules to codify and explain. In many cases, a single 3D failure mechanism/concern can drive hundreds of 2D design rules. The development of those 2D design rules requires significant assumptions about the 3D nature of the integrated process flow and resulting structures.

2D DRCs are developed from relatively simple calculations that may result in overly conservative designs. For example, consider the 2D design rules required to assure a minimum contact area between a line on a metal interconnect layer and an underlying via. A via is a vertical, electrically conductive connector between two interconnect layers, also called metal layers, or a vertical connector between an interconnect layer and a device such as a transistor, resistor or capacitor.

Many additional 2D DRCs are required to satisfy a criterion that is very simple to state in 3D: that the contact area between metal lines and vias must exceed a specified threshold value. The 2D DRC situation becomes even more complex when one considers that multiple manufacturing variations can affect the contact area, including over or under-exposure during lithography steps, mis-registration of the masks, planarization (via chemical mechanical polishing (CMP)) of the via layer, and the sidewall tapers produced by plasma etching. It is infeasible to include all of these statistical variations in the simple formulae that drive 2D DRCs, so the DRCs are stricter than necessary to guard against manufacturing variations. These overly strict 2D DRCs may result in sub-optimal designs with wasted area on the die.

In contrast to a 2D DRC environment, a virtual fabrication environment may perform checks, such as minimum line width, minimum space between features, and minimum area of contacts, directly in 3D without making assumptions about the translation from 2D to 3D. Checks performed directly in 3D are referred to herein as "3D DRCs". One benefit of 3D DRC is that the required number of checks is significantly smaller than the number required in 2D environments. As a result, the checks are more robust and easier to develop than 2D checks. Furthermore, with a much smaller set of 3D rules, the virtual fabrication environment can perform the checks for a range of statistical variations in process parameters.

It should be appreciated that 3D-DRCs are distinct from virtual measurement/metrology operations that may also be performed in the virtual fabrication environment. The virtual measurement metrology operations mimic actual measurement and metrology operations in the fab, whereby a measurement location is specified and a metric such as a distance value or area is output. For 3D DRCs, on the other hand, a geometric criterion is specified and the location and value of the criterion are desired. That is, the location is an output of the 3D DRC operation rather than an input. For example, a virtual metrology operation may specify an oxide film thickness measurement at a specific location indicated by a locator in the 2D design data, whereas a 3D DRC for minimum layer thickness may request the location(s) anywhere in the 3D model where the oxide film thickness is less than a specified threshold value. The 3D structural model may then be searched for locations where the specified minimum dimensional criteria are satisfied. Similarly, a 3D DRC may also cause the structural model to be searched to see if a maximum dimensional criteria is satisfied. 3D DRCs of this type thus provide benefits unavailable with virtual measurement/metrology operations for identifying unexpected causes of failures.

Examples of 3D-DRCs Include:

Electrical Net Isolation: finds the shortest distance between selected conductors. A conductor is a lump that may be comprised of one or more conducting materials (a "lump" is a discrete volumetric region (technically, a 3-manifold) within a 3D structural model. A lump may be composed of a single material or multiple materials);

Minimum Separation: finds the shortest distance between any pair in a group of selected lumps;

Minimum Line Width, finds the shortest distance through any lump in a group of selected lumps;

Minimum Layer Thickness, finds the shortest distance through any lump in the collection of lumps that comprise a layer of material;

Minimum Contact Area: finds the smallest contact area between all pairs of selected lumps.

Lumps may be selected on the basis of constituent material(s), electrical conductivity or other properties. Each of the 3D DRC checks can be extended by specifying a threshold value. For example, specifying a threshold value for a Minimum Line Width check produces a list of locations where the minimum line width is less than the threshold value. Those skilled in the art will recognize that other checks of this nature may be defined.

Analytics Module

In one embodiment, the virtual fabrication environment includes an analytics module. The analytics module is designed to mimic the workflows in use cases encountered by semiconductor process integrators. Exemplary use cases encountered by semiconductor process integrators and addressed by the analytics module may include but are not limited to, key parameter identification, process model calibration and variability analysis. In key parameter identification, the analysis module may find process steps/parameters that most strongly influence an outcome (calibration, defect mode, etc.). In process model calibration, the process parameters may be adjusted to make the 3D model match measurements from a physical fab, such as, but not limited to, Transmission Electron Microscopy (TEM) data or a process target. In variability analysis, the analytics module may assist the user in analyzing and understanding the variability in metrology data obtained for a set of virtual 3D models such as, but not limited to, by estimating variability in structural or electrical parameters for specification limit setting.

The analytics module described herein may generate process variation via experimental design or Monte Carlo simulation applied to parameters and settings in the virtual semiconductor fabrication environment and then perform automated statistical analysis, optimization, and visualization for users. The data being analyzed can include the settings of the input process parameters as well as, but not limited to, the metrology, structure search, Design Technology Checking (DTC) checks, and electrical analysis, that are evaluated on the 3D virtual semiconductor structures produced in the virtual fabrication environment. Embodiments utilize statistical methods chosen and customized to solve problems and address issues peculiar to virtual semiconductor fabrication and correct for errors that may occur when exporting result data to conventional third party statistical tools.

Embodiments also provide a more efficient technique for experimental design as the particular manner in which the virtual semiconductor fabrication environment of the present invention constructs 3D models results in not having certain common problems that other experimental design methods must address. For example, if the deck and the parameter settings are not changed, the same 3D model will be generated each and every time in the virtual semiconductor fabrication environment. Thus there is no random component to the 3D model output and the three common tasks in experimental design of randomization, replication and blocking are not needed to be performed.

In one embodiment, the analytics module is integrated into the virtual fabrication environment resulting in improved and new functionality not available via third party statistical solutions. In one embodiment, the UI and algorithms may be organized by use cases and follow a left-side, step-wise flow UI for each use case. This design may strongly guide the user (who may lack statistical training) to perform correct analysis steps so that they avoid mistakes in the analysis. The analytics module may also include a statistical analysis engine that employs a set of analysis algorithms to correctly analyze each specific use case. The analytics module may solve problems not correctly addressed by third party statistical software such as multi-collinearity and outliers (discussed below), and, as previously noted, avoids using methods that are not required, e.g., randomization during experimental design. Results of the analysis may be provided to a user or to third party software in a number of formats.

Figure 13:
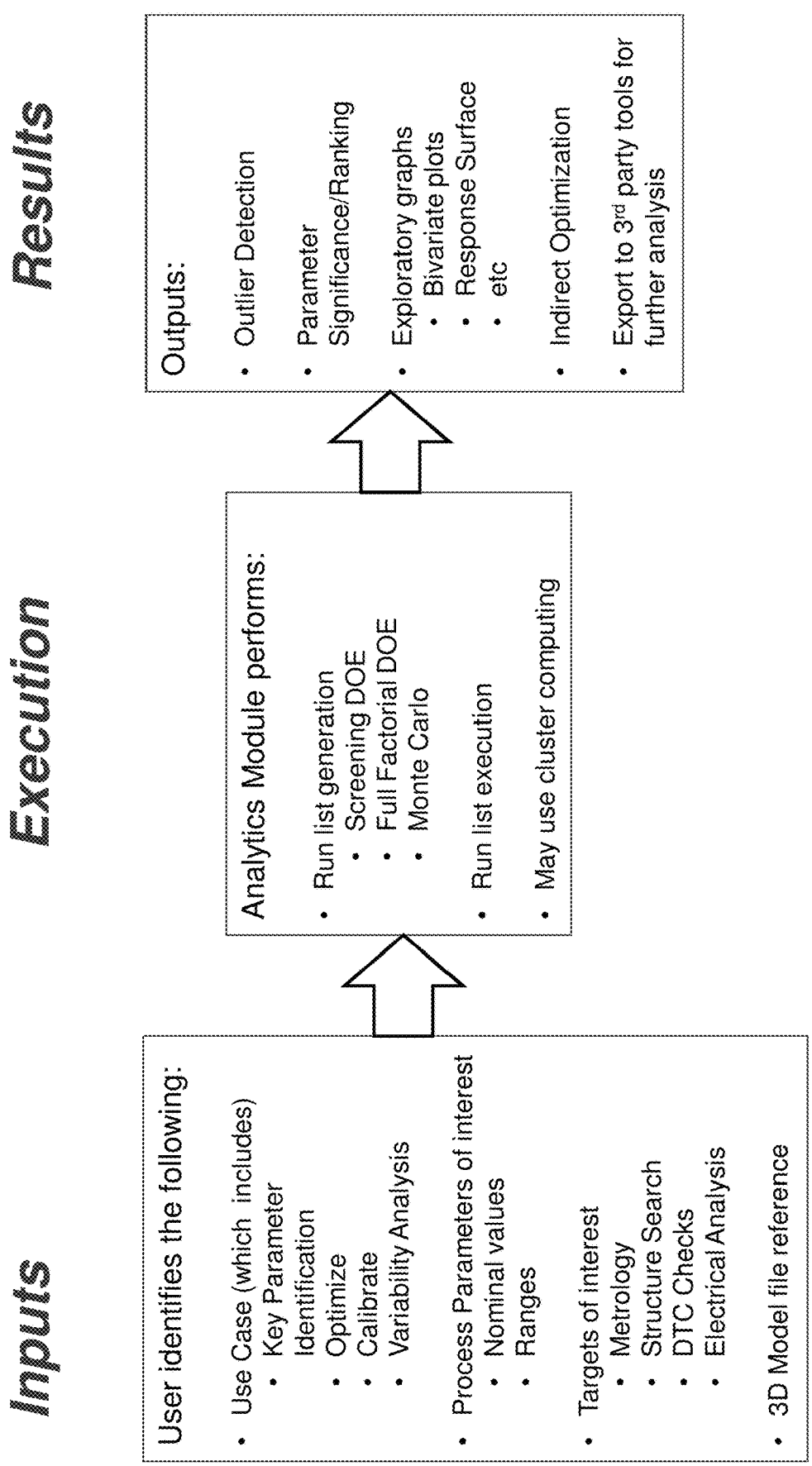
FIG. 13 depicts an exemplary analytics flow in an exemplary embodiment.

FIG. 13 depicts an exemplary analytics flow in an exemplary embodiment. Inputs to the analytics module may include, but are not limited to, selection of the type of analysis, which may be organized by use case (e.g. identifying key parameters, optimization, calibration, variability analysis). Additional exemplary inputs include process parameters of interest (e.g. specified as nominal values and/or ranges) and targets of interest (e.g.: metrology values, structure searches, DTC checks, electrical analysis values). In one embodiment, an input value may be a reference to a 3D model file. The analytics module may perform run list generation to set up the experimental Design of Experiments (DOE) (e.g. a screening D.O.E., a full factorial D.O.E., a Monte Carlo simulation) followed by run list execution and may utilize cluster computing to increase efficiency during execution. Outputs from execution may include outlier detection and statistical analysis results such as determining parameter significance/ranking. Outputs may also include exploratory graphs (e.g. bivariate plots, response surface) and indirect optimization. In one embodiment results may also be exported to third party tools for further analysis.

Key Parameter Identification

One exemplary use case for an embodiment employing an analytics module as described herein is key parameter identification. In key parameter identification the analytics module receives a user selection of a deck containing a 2D layout and process steps. The purpose of the key parameter identification use case is to determine which parameters are related to and affect a target. Then, those parameters are ranked to show their relative importance. In one embodiment, the use case has seven steps:

1) Pick experimental design;
2) Select parameters to vary and input user-selected levels into design;

3) Generate design and run (export if necessary);
4) Select metrology targets;
5) Set regression options;
6) Select identified outliers for addition or removal from DOE result data; and
7) Run regression and view results. Identify important/key parameters.

Figure 14A:
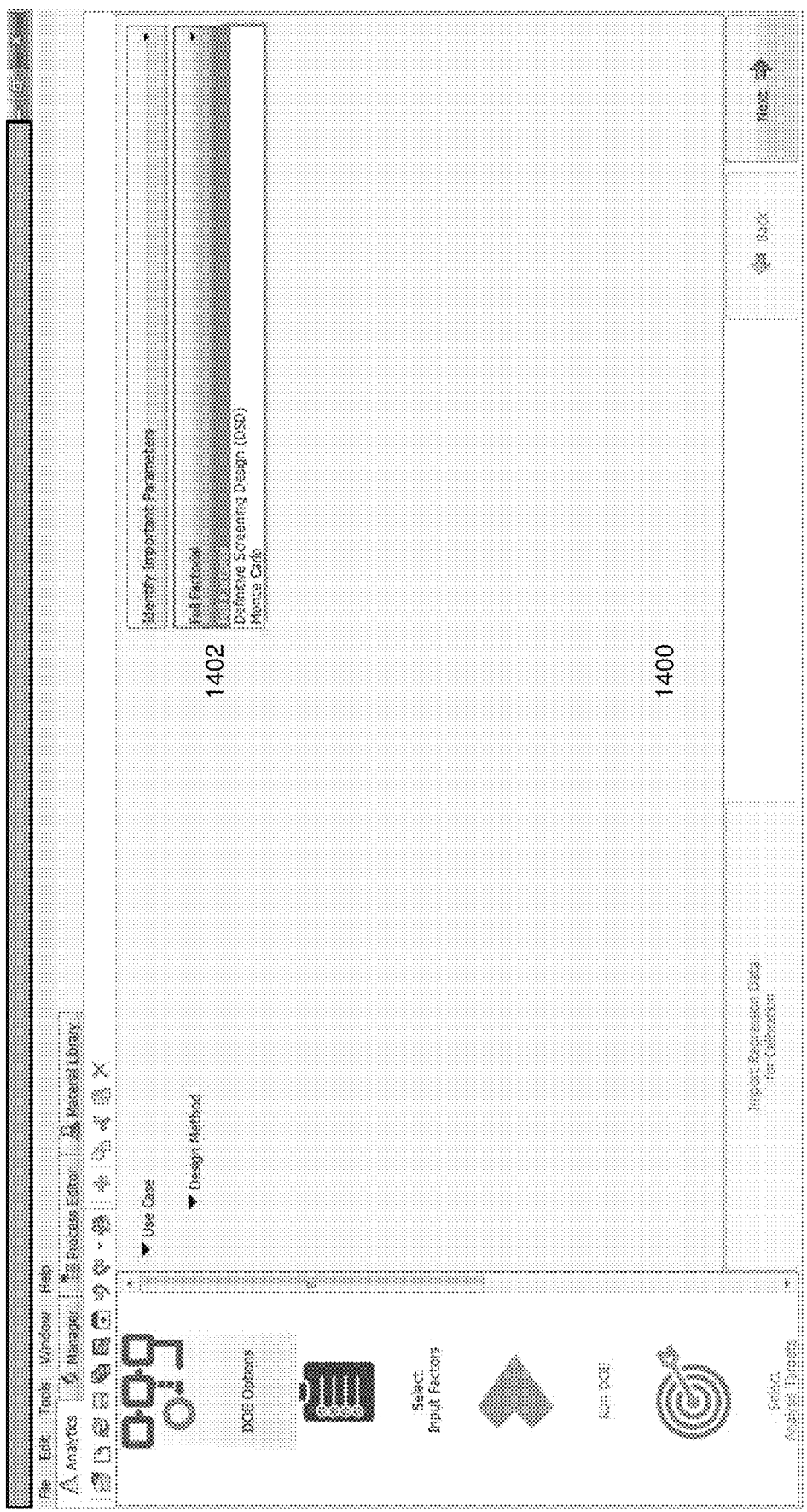

In this embodiment, the first step is a selection of a Design of Experiments (DOE) step, also call experimental design. D.O.E. is a methodology for calculating the number of experiments at specific combinations of parameters settings such that more information is gained for less experimental effort. The analytics module provides three ways to create an experimental design to sample the parameter space: full factorial design, Definitive Screening Design (DSD) and Monte Carlo simulation. FIG. 14A depicts an exemplary UI 1400 provided in the virtual fabrication environment for making the selection of the type of experimental design 1402.

Full factorial design is the most classic experimental design. All possible combinations are created. Full factorial designs are best used when the number of parameters are smaller, approximately from 2 to 7. For each parameter setting chosen, the user inputs the number of levels and the values for those levels via the UI. In one embodiment up to 10 levels can be input for each parameter setting.

Definitive Screening Design (DSD) is a screening design used when the number of parameters is larger or the cost (time) of runs is high. It produces far fewer runs than full factorial designs for the same number of parameters. Embodiments may implement the DSD-augmented method for continuous variables only. In one embodiment, for a DSD, there are only three levels specified for each parameter.

Monte Carlo simulation is a D.O.E. option that allows for random generation of parameter settings using normal or uniform distributions. In an embodiment, the UI allows the user to input means and standard deviations for normally distributed parameters, or minima and maxima for uniformly distributed parameters, and random values are generated accordingly. In an embodiment the user may also enter the number of runs desired.

Figure 14B:
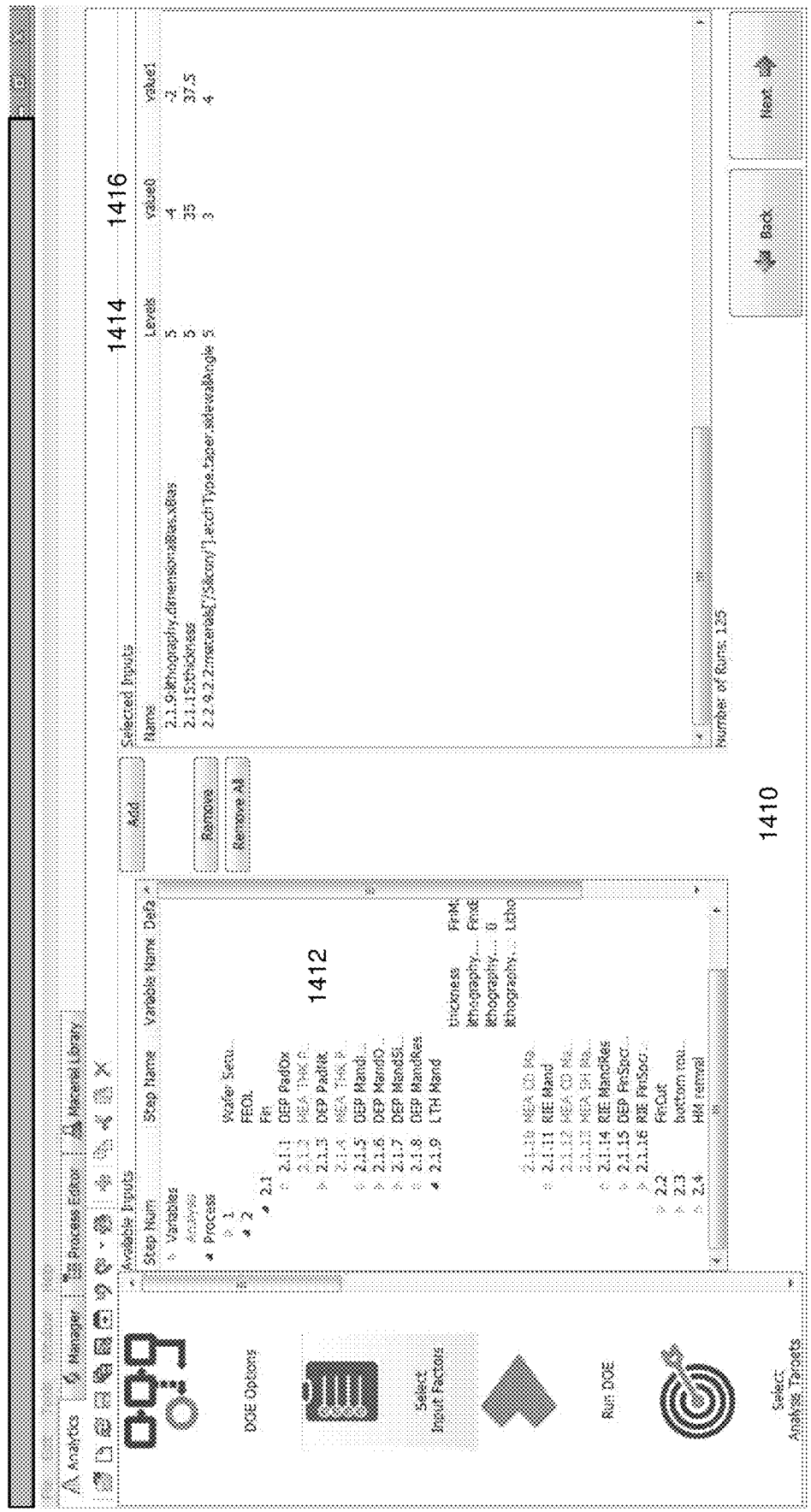

FIG. 14B depicts an exemplary UI 1410 in an embodiment by which a user can specify the levels for each parameter being varied in the design. FIG. 14B shows a screenshot for selecting parameters for a full factorial DOE. The left pane contains the list 1412 of parameters in the deck. Each can be selected and added to the right pane. There, the user inputs the desired number of levels 1414 and values 1416 for each level. For example if three parameters have been selected and they have 3, 2, and 4 levels respectively they would produce 3*2*4=24 runs.

In an embodiment, the D.O.E. that has been created in the previous steps is run by the virtual semiconductor fabrication environment in batch mode, producing a 3D model for each run in the DOE. The D.O.E. may be exported to a csv or other type of file as well.

Figure 14C:
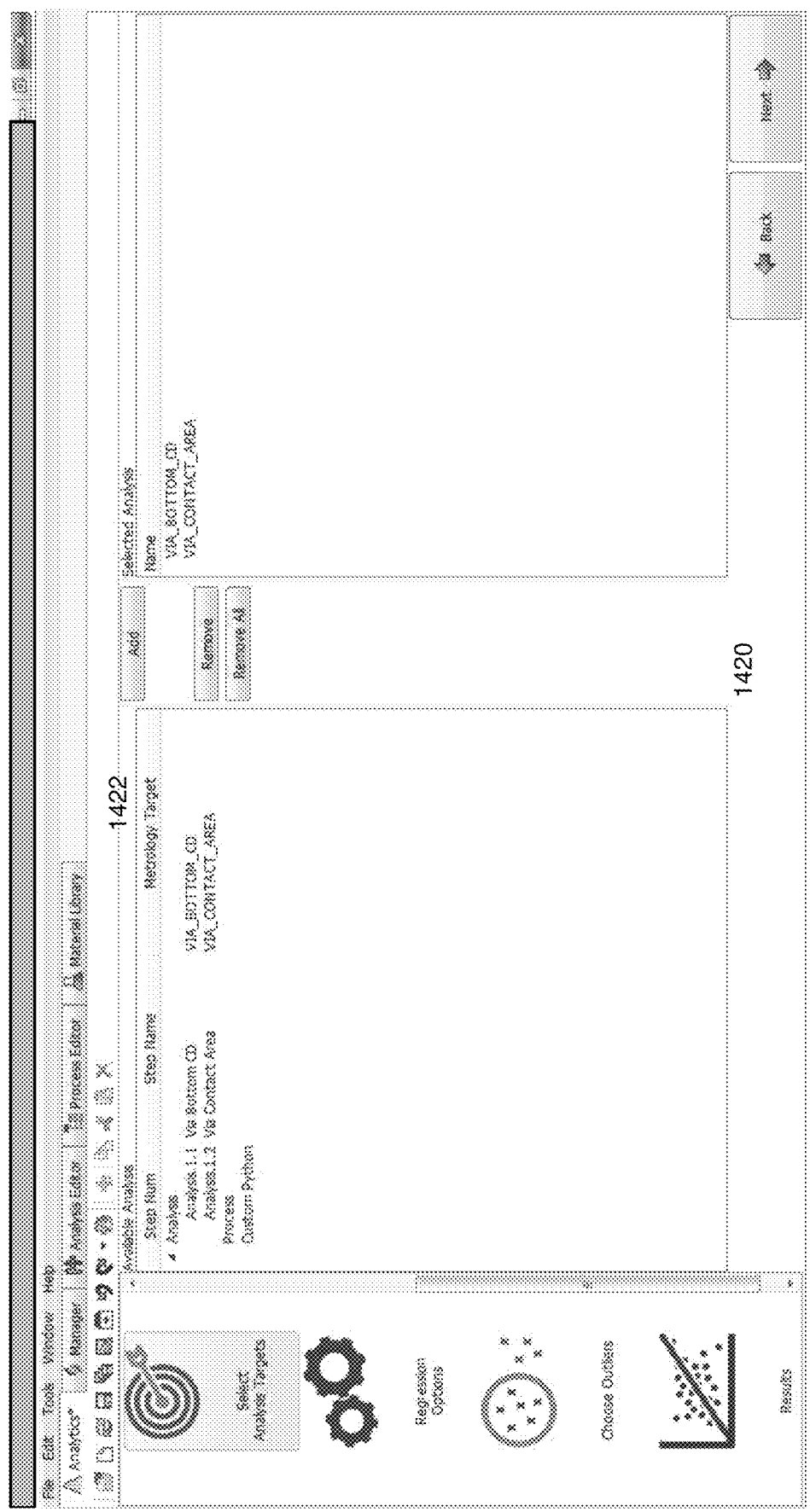

In the fourth step of the key parameter identification workflow, the metrology targets may be selected by the user to acquire measurements on the 3D models produced by the DOE. An exemplary UI 1420 for making the selection of metrology targets 1422 is depicted in FIG. 14C.

Figure 14D:
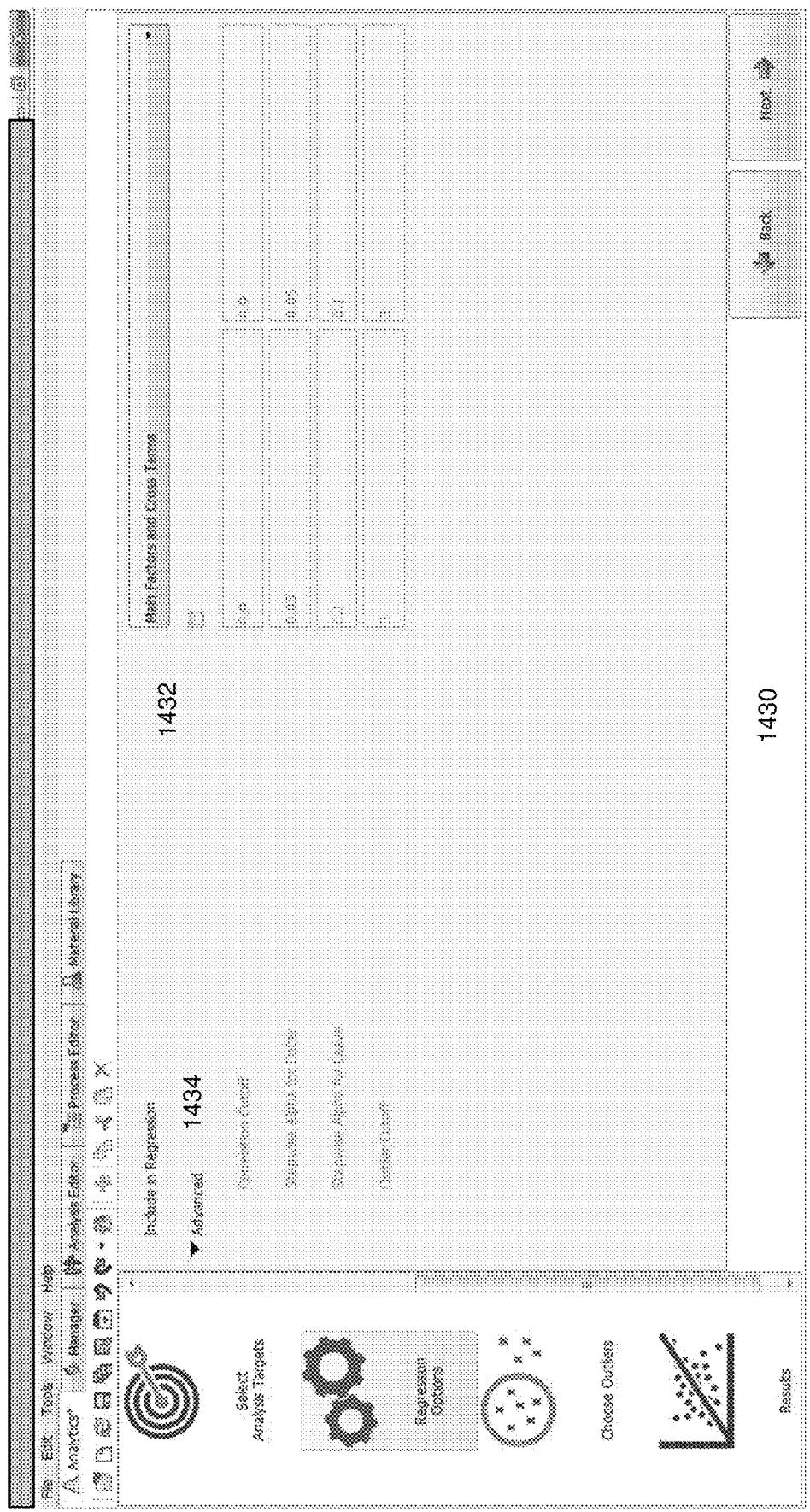

To perform key parameter identification, a regression model is built in the fifth step of the workflow. In FIG. 14D, in an exemplary embodiment, the UI 1430 enables the user to select 1432 whether to build a regression model with main effects (original parameters) only, or to build a full quadratic model. In another embodiment, the type of regression model is automatically selected. In one embodiment, default options may be provided for either type of regression model and may be changed by a user. In another embodiment there may be additional options provided for more knowledgeable users. These additional options 1434 may include a cutoff for a collinearity test and two entry/exit p-value cutoffs for stepwise linear regression. The collinearity test enables correct handling of multicollinear variables and correct identification and exclusion of outliers from the statistical analysis being performed within the virtual semiconductor fabrication environment. Multicollinearity occurs when two or more predictor/independent variables in a multiple regression model are highly correlated such that one can be predicted from the others with a high degree of accuracy. The fitting of a quadratic model often produces multicollinear variables and embodiments address this issue as described further below.

Figure 14E:
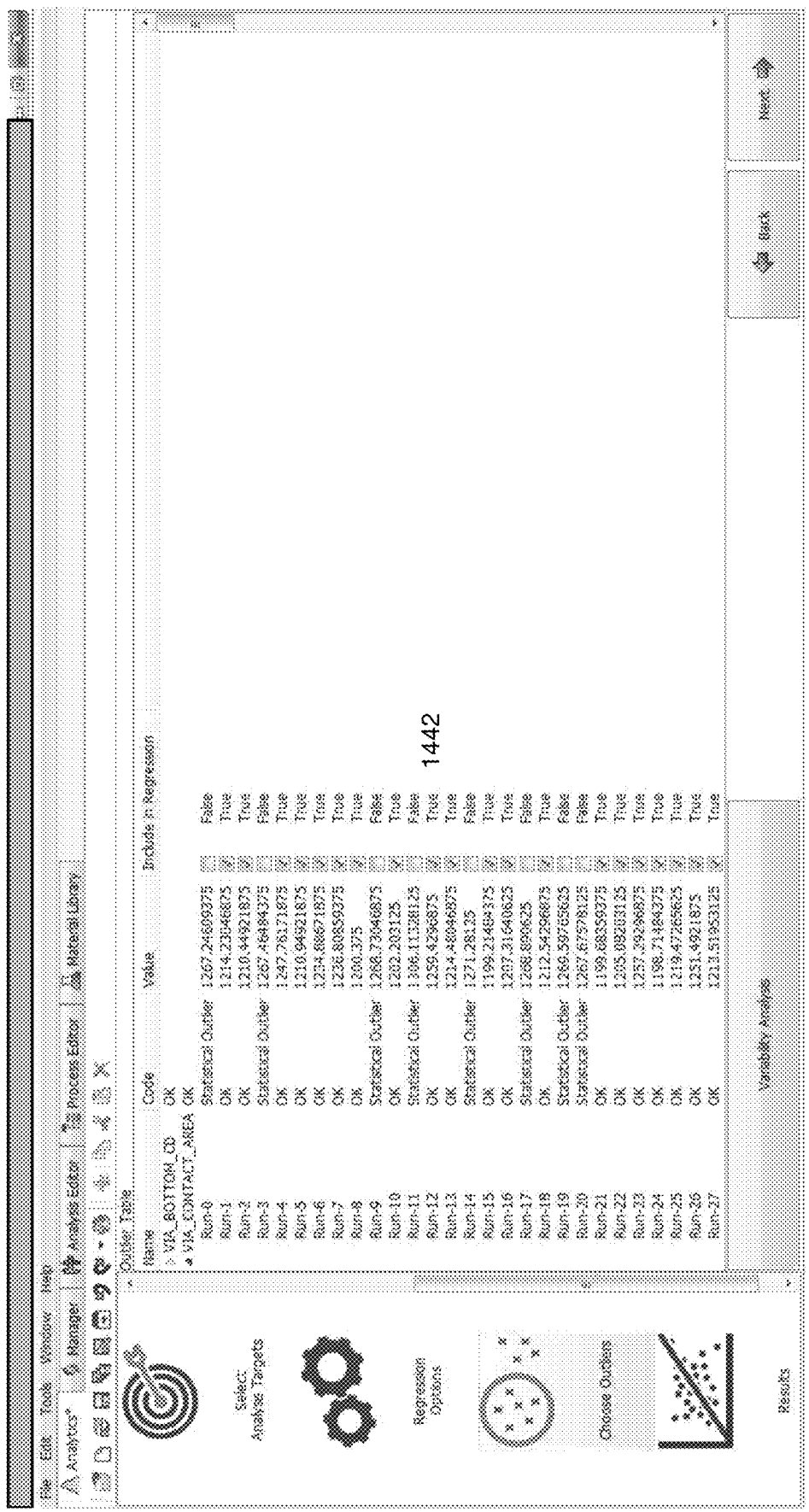

Within the set of 3D models created from the experimental design, one or more 3D models may have targets (metrology, CD, etc.) containing data values that are unusual in some respect (outliers) that would adversely affect or prevent a (correct) statistical analysis. The analytics module identifies outliers for the user. In FIG. 14E, in an exemplary embodiment the UI 1440 enables the user to select from among identified outliers 1442 to determine which should be omitted from the target data when performing statistical analysis. There are four types of outliers that are tested for in a target in this step. Empty cells—Empty data cell returned for a target if the run failed (no 3D model could be built). This type of run is marked automatically as an outlier to be removed during statistical analysis and cannot be put back in by the user. NOVAL—If a run completed, but the target measurement could not be calculated, a text value of "NOVAL" is returned. This type of run is marked automatically as an outlier to be removed during statistical analysis and cannot be put back in by the user. Constant Values—Multiple values for a target may be identical. If many results for a target are identical, this will prevent or distort statistical modeling. The target data is tested to check if a certain amount of data, for example 50% or more of the data, is identical/constant by comparing it to the median. Those runs are removed. If all the target data is identical, an error is reported. Statistical Outliers—These are data points that are sufficiently far from the center of the data that they may need to be excluded from the analysis. The Median Absolute Deviation (MAD) method may be used to statistically test if each data point is an outlier. Given that $MAD=median(|x-median(x)|)$, a robust equivalent to the standard deviation may be calculated as $SM=1.4826*MAD$. Data values exceeding $MAD \pm K*SM$ (where $K=3$ by default and is equivalent to 3 standard deviations) may be considered outliers and marked as such for user inspection. In one embodiment users may place any of these outliers back into the analysis. It should be appreciated that there can be outliers in measured data that are not a concern when using the types of designs discussed here, i.e. DSD, full factorial or Monte Carlo simulation, since by definition, those data points are in-range, unless the user has made a typographical or other error in setting the levels/ranges.

Following removal of the outliers, a number of types of statistical analysis may be performed on the data for the targets. For example, in one embodiment, the analytics module may make input parameters for a regression model (squares/cross-terms if selected). This permits fitting basic curved relationships between the x parameters and the target y. A set of variables X can be fit to a linear regression model and the equation can be represented in linear algebra notation as: X*b=y, where X is a matrix with n rows (the runs) and k columns (the variables). In an embodiment, the analytics module can also perform a multicollinearity check for all possible pairs of input variables, calculate the correlation coefficient r, and remove one parameter of every pair with |r|>0.9 (this cutoff can be adjusted by the user). This fixes the multicollinearity problem in most cases.

In an embodiment, the analytics module can also perform an undetermined matrix check to check if X is underdetermined (k>n). If there are more variables than data points (runs), there is not enough data to find a unique regression solution using standard equations (algorithms fail to return an answer). There are two solutions: 1) delete variables (use only main effects instead of a full 2n d order model), or 2) use a method like principal component regression. In one embodiment the first type of solution is applied by the analytics module to delete variables. If k>p, then the squares and cross-terms are removed and checked again. If X is still underdetermined, the regression cannot be performed and an error is returned to the user.

The analytics module may further run a number check on the data. After outlier deletion, depending on the design chosen by the user and its size, there may not be enough runs left to bother with a regression. In one embodiment the check is to determine if the number of runs n is <10 in which case there is not enough data and an error is returned to the user.

In an embodiment, the analytics module may perform stepwise linear regression. The forward approach may be used: the initial model includes only an intercept (the $\beta_0$ weight) and all variables are tested for statistical significance to see which one, if any should enter the model. Once a variable is chosen, say variable $x_3$, then all the remaining variables are tested for inclusion into the new model. This process continues until no variables meet the inclusion criteria (a p-value<0.05, user adjustable). Variables in the model are also tested for removal (a p-value>0.10, user adjustable).

In an embodiment the analytics module may perform a relative importance calculation to identify key parameters. If a model is generated with two or more statistically significant parameters, a new linear regression is calculated using only those variables, but after they have been autoscaled. To autoscale a variable, the variable's mean is subtracted from all data points and then the resulting values are divided by the variable's original standard deviation. This makes all the variables have a mean of 0 and a standard deviation of 1. The reason for doing this is variable scale. One variable may be in a range 0 to 1, while another variable may be in a range 50 to 80. Importance (size of weights, the $\beta$ values) in regression is affected by variable scale. If one wants to know which variables are more important by examining the $\beta$ values, the variables in the regression model have to be converted to have the same variance, which autoscaling accomplishes.

Figure 14F:
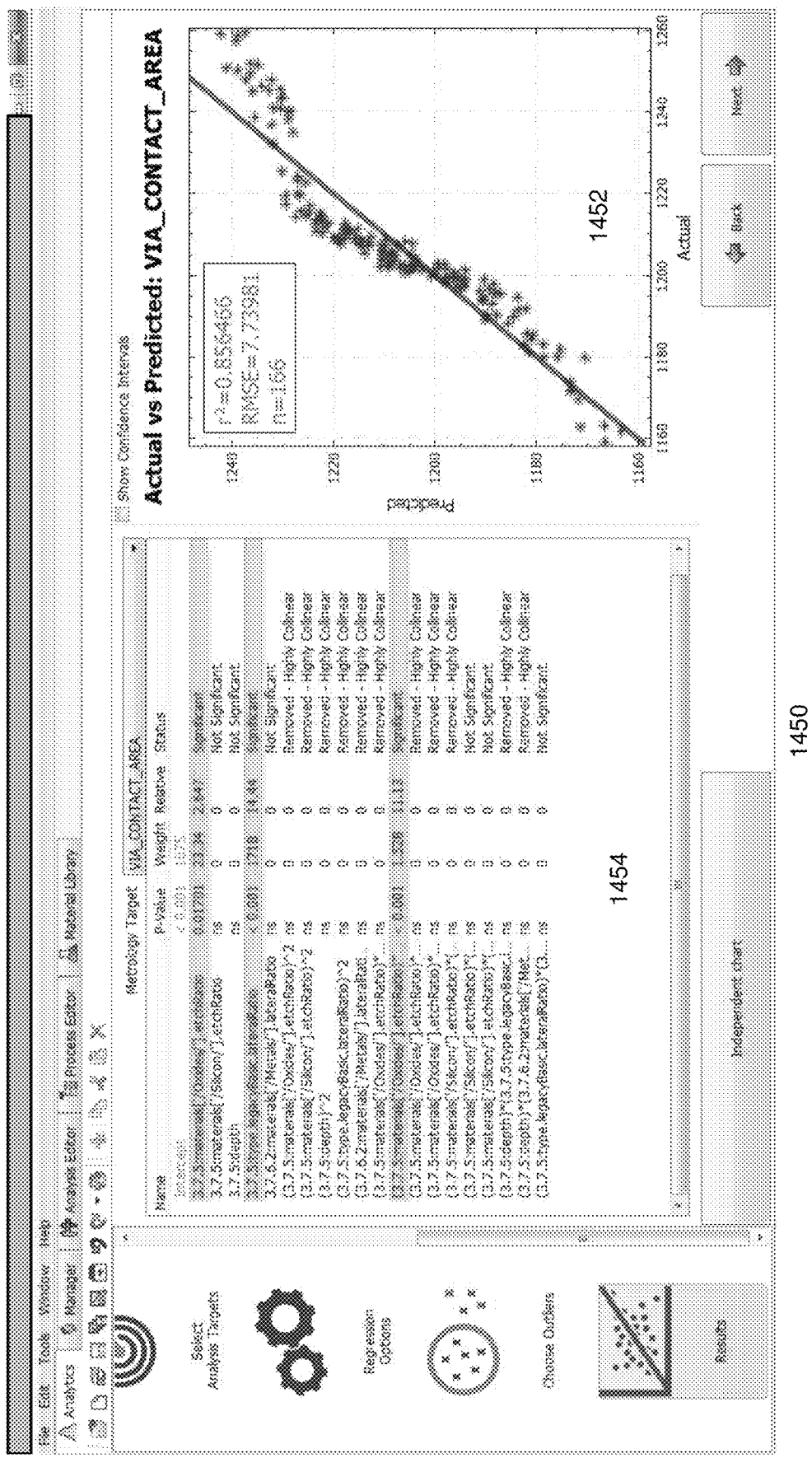

The results may be presented via a user interface 1450 to the user in a number of different formats, such as, but not limited to, a plot with annotation 1452 and in a table 1454 as depicted in FIG. 14F. The plot is a plot of predicted target vs. actual target. In one embodiment it may be annotated with the following: r2 (regression squared correlation coefficient, ranging from 0 to 1, indicates fraction of target variation explained by the model), Root-Mean-Squared-Error (RMSE, a measure of predictive accuracy), and n (the actual number of data points/runs used in the regression model). In one embodiment the output table 1454 of regression results may have five columns as depicted in larger form in FIG. 14G. Column 1: Parameter Names. These are the names of the original variables, and if included, the square and cross-terms. Column 2: p-value for significant variables Column 3: Regression weights ($\beta$). Column 4: Relative Weight. Regression weights ($\beta$) for a regression calculated with autoscaled variables. These can be used to rank the significant parameters. For example, a parameter Etch4 lateral ratio may be determined to be more important than Etch1 etchratio when the relative importance is calculated. Column 5. Status. In one embodiment there are four possible results: non-significant, significant, removed highly collinear and removed underdetermined. In an embodiment, significant parameters have non-zero weights and scaled importance that indicate how important a given process parameter is for the chosen metrology.

Figure 15:
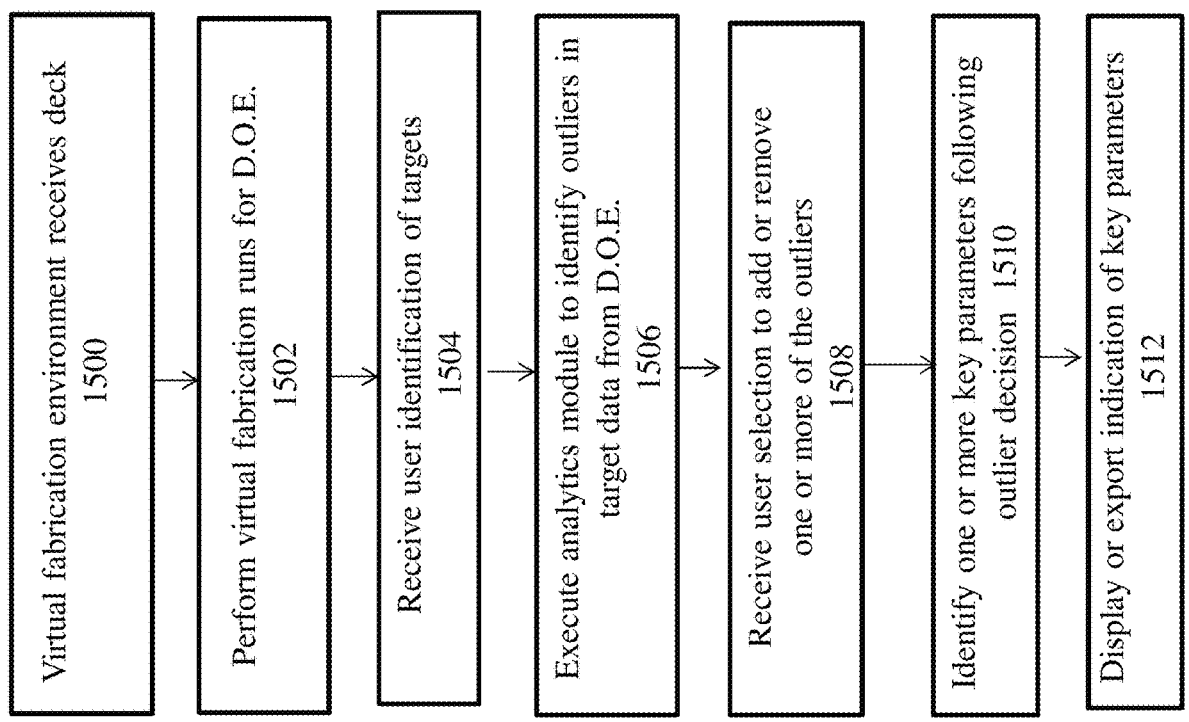
FIG. 15 depicts a sequence of steps performed to identify key parameters in an exemplary embodiment.

This approach to key parameter identification is further summarized in FIG. 15 which depicts a sequence of steps performed to identify key parameters in an exemplary embodiment. The sequence begins with the receipt of a user identification of a deck (layout data and process steps) by the virtual fabrication environment (step 1500). Multiple virtual fabrication runs are then performed for a D.O.E. for the semiconductor device of interest (step 1502). In one embodiment, a user selection of the type of D.O.E. and additional D.O.E. related input selections are received through a user interface provided in the virtual fabrication environment. Alternatively, in another embodiment, the type of D.O.E. and D.O.E. parameters are automatically selected by the virtual fabrication environment. A user selection of targets (e.g.: metrology measurement, a structure search, a DTC check and/or an electrical analysis) is received (step 1504) and the analytics module identifies outliers in the target data produced by the virtual fabrication runs as described above (step 1506). The identified outliers are displayed to the user and then a user selection adding one or more of the outliers back into the target data or removing the outliers from the target data is received via a provided user interface (step 1508). The adjusted target data following the outlier decision is then used by the analytics module to perform a regression analysis to identify one or more key parameters for the D.O.E. (step 1510). An indication (e.g. list, plot, chart) of the identified key parameters is then displayed to the user or the identified key parameters may be exported to a third party application for additional processing (step 1512).

Process Model Calibration

The analytics module may also perform process model calibration. In process model calibration process step parameters and settings are adjusted in the virtual fabrication environment to make the virtual 3D model produced from virtual fabrication runs match a physical semiconductor produced in a physical fabrication environment. Once calibrated, the parameters and their settings in the virtual semiconductor fabrication environment may be varied to introduce changes in the 3D models and provide insight into what process changes will improve various semiconductor properties. In one embodiment, a wizard user interface is provided to guide the user through the process of optimizing the virtual 3D model to match the physical semiconductor. The user selects measurement target(s) and their desired value(s), weights the importance of targets if there are multiple targets, sets parameter bounds, runs one or more trials, and receives optimized parameter values and corresponding measurement target results.

Conventional virtual fabrication environments that adjust process parameters in a calibration effort lack a system-level component enabling proper process model calibration. Further, many semiconductor process integration engineers have little or no statistical knowledge. Consequently, those engineers perform process model calibration by adjusting parameters in a primitive trial and error fashion, usually via a one-factor-at-a-time (OFAT) approach. This approach is time-consuming and gives poor quality solutions, when it finds any solution at all. The OFAT approach guarantees that the optimal parameter sets cannot be found because it does not take into account the effects of any interactions among the parameters.

To address these issues, embodiments provide automated statistical analysis, optimization, and visualization for users (e.g.: semiconductor process integrators who may have limited or no statistical knowledge) using an analytics module integrated into a virtual fabrication environment. More particularly, embodiments provide a programmatic approach to solving the problem of calibration without confusing the engineer untrained in statistics. A statistical analysis engine in the analytics module employs a set of analysis algorithms to analyze each specific use case with little user input. In one embodiment a user interface (UI) is a wizard whose purpose is to strongly guide the user to perform the correct analysis steps. The wizard may be organized by use cases and follow a left-side, step-wise flow UI for each use case.

Figure 16:
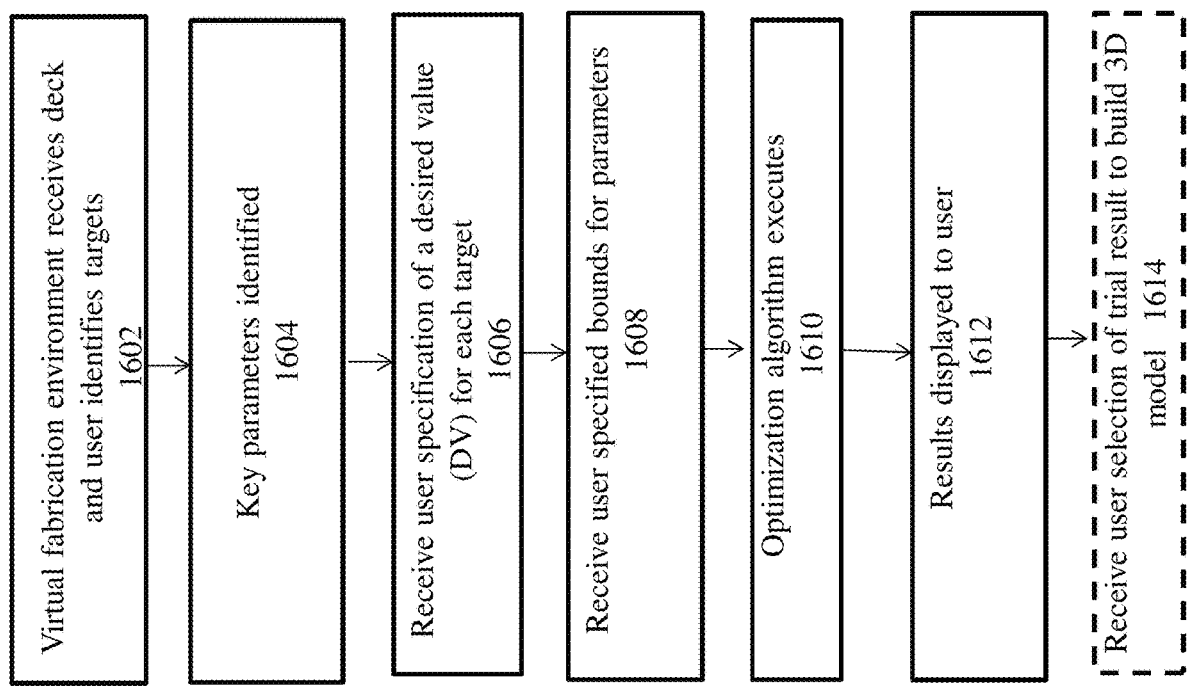
FIG. 16 depicts a sequence of steps performed for process model calibration in an exemplary embodiment.

An example workflow for process model calibration performed in an exemplary embodiment is depicted in FIG. 16. The sequence begins with the virtual fabrication environment receiving an identification of a deck (layout data and process steps) from which to produce a virtual 3D model of a semiconductor device of interest. In most cases the deck will be retrieved following a user selection/specification provided via a UI provided in the virtual fabrication environment. The UI also receives a user identification of one or more measurement targets on the 3D model that the user desires to have match measurement targets on a corresponding physical semiconductor (step 1602). Targets may be, but are not limited to, values related to metrology values, structure searches, DTC checks, electrical analysis, etc. evaluated on the virtual semiconductor structure. In another embodiment, the deck may be selected programmatically without user input.

The parameters which are important (key parameters) and should be adjusted to make the 3D model target values match the experimental data are then determined (step 2904). In one embodiment, this determination is done via the key parameter identification process performed by the analytics module as discussed above. Alternatively, in another embodiment, the key parameters may be manually selected by the user via a UI.

The sequence continues by receiving a user specification of a desired value (DV) for each target via the UI (step 1606). A DV can be, but is not limited to, a distance obtained from a TEM, or the quality of a match between a slice of the 3D model and a whole TEM, or an optical spectra. Relative weighting is applied to each target by default or as indicated by the user, e.g., for two targets A and B, target A may be weighted to be twice as important as target B if the user desires.

The sequence continues by receiving a user-specification of each parameter to be adjusted in the calibration with the user setting lower and upper bounds (step 1608). The optimization algorithm provided in the analytics module keeps the parameters inside these bounds as it iterates towards a solution.

The analytics module next executes an optimization algorithm (step 1610). The optimization algorithm may perform indirect or direct optimization, both of which are described further below. In one embodiment, the user may have options to select or specify, such as number of iterations, convergence tolerance, type of scoring function (L-2 or L-1), number of trials, etc. In some embodiments, for multiple trials, random starting values of the parameters may be created that are inside the lower and upper bounds previously specified.

The results of the optimization algorithm are displayed to the user (step 1612). In one embodiment, the user can select a trial from the displayed results via the UI to trigger the building of a 3D model in the virtual fabrication environment (step 1614).

Two different types of optimization algorithms may be used by the analytics module. Indirect optimization applies an optimization algorithm to the regression equations created during the key parameter identification process. Indirect optimization has the advantages of being very fast since it does not call the virtual fabrication environment to build additional 3D models and generally avoids local minima because the regression equations provide a set of planes making the response surface (a response surface indicates the relationship between the parameters and the error between the 3D model targets and Desired Values). Trials begun from random starting points in parameter space tend to converge to similar results, so users may be able to use only a small number of trials to perform their optimization task. It should also be noted that indirect optimization has the disadvantage that if the regression equation(s) poorly predict the target(s), e.g., if the response surface is highly non-linear, the results will be of poor quality.

Direct optimization is much slower than indirect optimization and may be used in an embodiment where the key parameter identification process discussed above is not followed. In this method, the optimization algorithm calls the virtual fabrication environment at each iteration, generating a new 3D model and associated metrology values and updating the optimization algorithm, which then adjusts the parameter values. This is a sequential optimization process. Direct optimization has the advantages of being the most realistic method and will work better for non-linear response surfaces, and does not necessarily require key parameter identification process described above be run first (no regression equations are required and the user would only need to pick parameters to optimize). It has the disadvantages of being slow since direct optimization calls the virtual fabrication environment to build 3D models at each iteration of each trial and may become trapped in local minima. These disadvantages can be alleviated by using multiple licenses (speed) and more trials to provide a broader sampling of parameter space to avoid the algorithm becoming trapped in a local minimum.

A variety of optimization algorithms can be used to perform direct and indirect optimization. As a non-limiting example, in one embodiment an interior-point algorithm with parameter bounds may be utilized for indirect optimization, although other algorithms could be used. For direct optimization, as a non-limiting example, genetic algorithms may be used as they can handle complex response surfaces with discontinuities and binary targets (present/absent).

As one non-limiting illustration of performing process model calibration with indirect optimization, in one embodiment a user first completes the key parameter identification process via the analytics module as described herein. More particularly, the user conducts an experimental design and regression on a set of parameters and targets (metrology, structure search, DTC checks, electrical analysis, etc. evaluated on the virtual semiconductor structure). This identifies the statistically significant parameters for each target, and creates a regression equation predicting each target using those statistically significant parameters. As discussed above, the user selects one or more target(s), enters the desired value (DV) for each target, and weights their importance. A default weighting for each target of 1 may be provided. For calibration options the user may pick if squared error is used (default) or not, and can set advanced options such as, but not limited to, the number of optimization trials, number of iterations and the convergence tolerance. Default values may be provided for each option. For example, the number of optimization trials may be set to a default value of 10, the number of iterations per trial may be set at a default value of 100, and the convergence tolerance may be set at a default value of 1e-6. Following the setting of the advanced options, the user may set, via the provided UI, the allowed lower and upper bounds for each parameter being optimized. The parameter values will be kept inside these bounds during the optimization by the analytics module. The user initiates the running of the calibration via the UI and the optimization begins. In one embodiment, the underlying compute engine may use an interior-point algorithm. Once the optimization trial(s) complete, the optimized parameter and target values are displayed for each trial, along with completion/error messages, and the user can select one trial to build in the virtual fabrication environment to assess the resulting 3D model.

Figure 17:
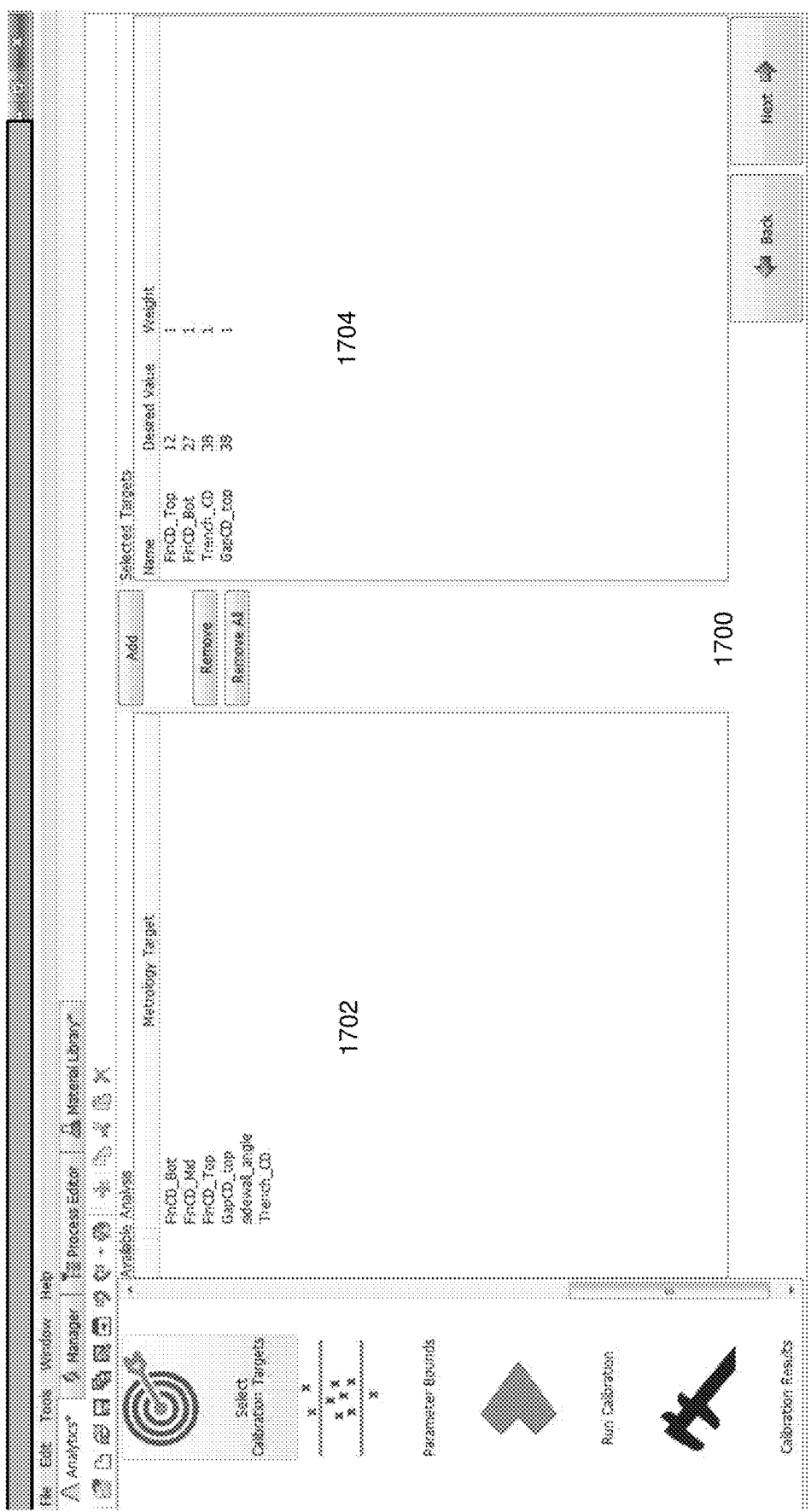
FIG. 17 depicts target selection and desired value entry options provided by a process model calibration UI in an exemplary embodiment.

As noted above, in one embodiment, the process model calibration sequence may be guided via a UI wizard. FIG. 17 depicts the selection of metrology targets for the process model calibration sequence described above where the user is guided to select targets from among targets for which regression data has been previously generated during the key parameter identification process. As explained further below, the regression data is subsequently used when performing indirect optimization. In one embodiment, the UI 1700 presents a selectable list of targets 1702 but limits the user to selecting from metrology targets that already have regression models. In an embodiment, no other parameters and no other metrology targets are provided. FIG. 17 also depicts a table 1704 in the UI enabling a user to specify DVs for the selected target. In the table in the right pane the user enters DVs (those cells may initially be empty) and weights, which may be 1 by default and can be changed by the user.

Figure 18:
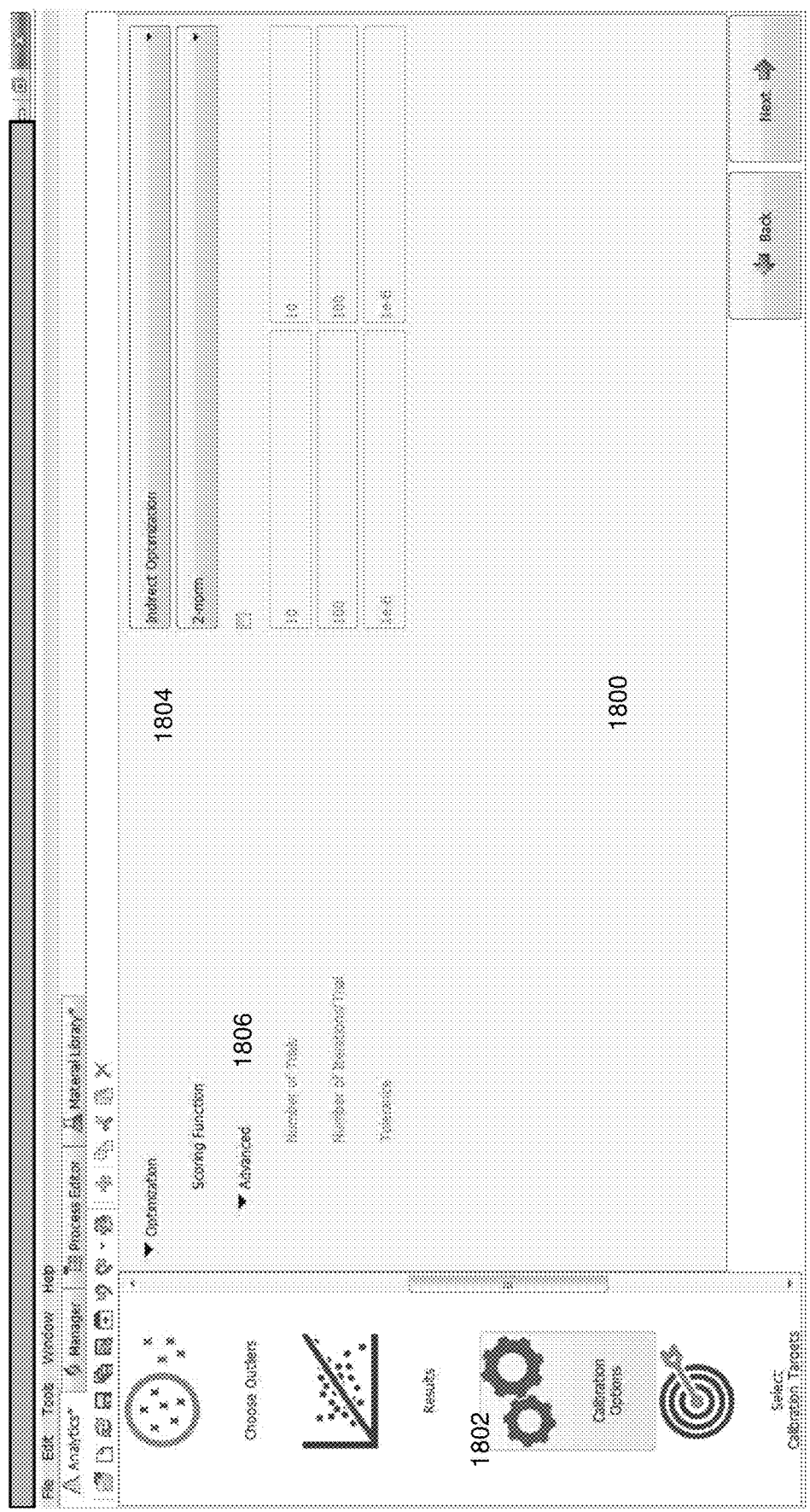
FIG. 18 depicts calibration options provided by a process model calibration UI in an exemplary embodiment.

FIG. 18 depicts an exemplary user interface 1800 enabling the selection of calibration options 1802 which may be provided by the process model calibration wizard. As depicted, in one embodiment, the optimization approach may be selected 1804 (indirect vs. direct) and an advance option checkbox 1806 may be provided by the virtual fabrication environment to enable the user to specify options such as the number of optimization trials, the iterations per trial and the tolerance desired by the user. Default values may be initially be provided which, in one embodiment, may be changed by the user.

Figure 19:
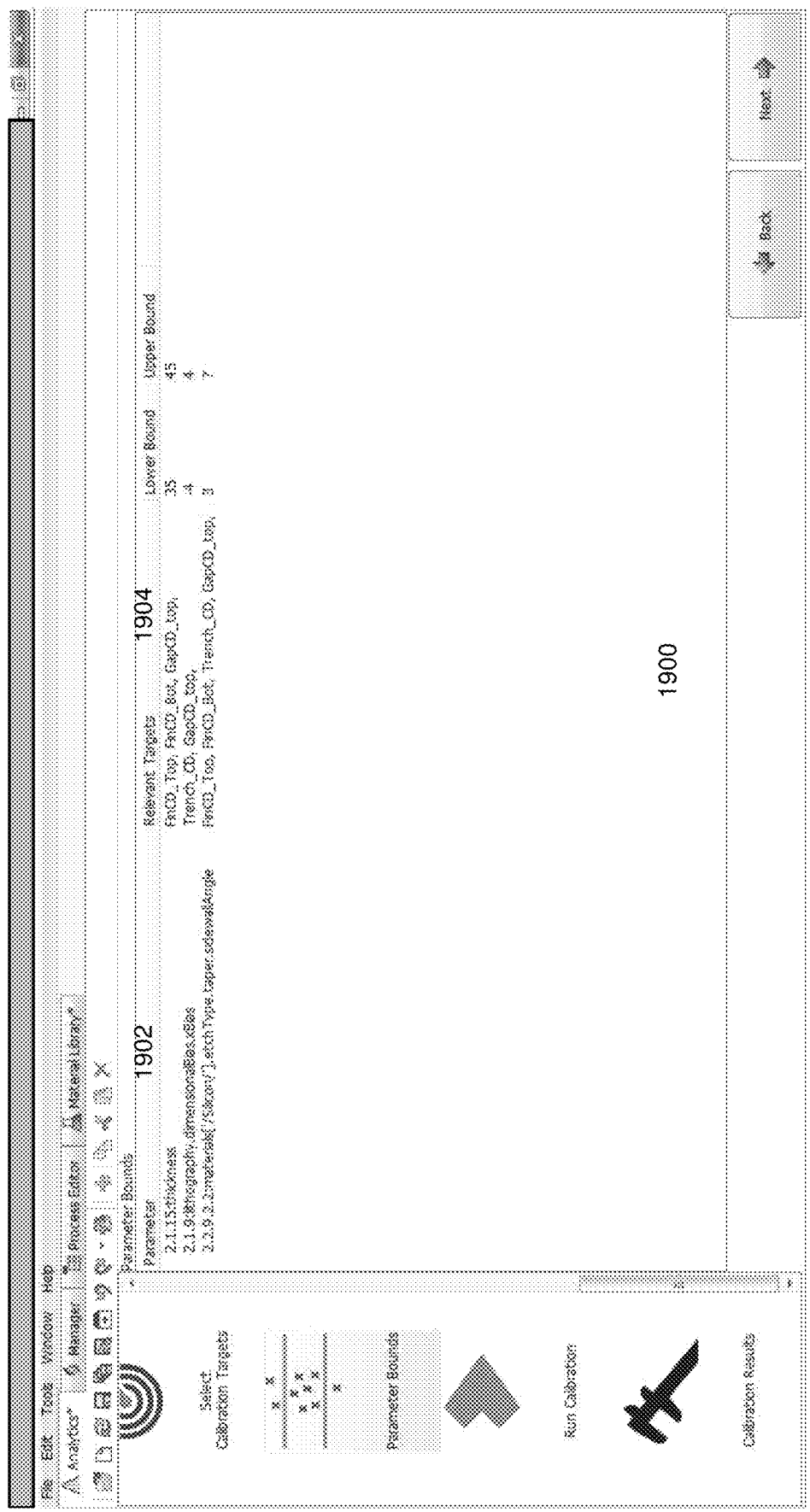
FIG. 19 depicts parameter bound entry options provided by a process model calibration UI in an exemplary embodiment.

The process model calibration wizard may also provide a user interface 1900 enabling the user to select parameter bounds as depicted in FIG. 19. A list of all the statistically significant parameters in the regressions selected by the users may be created by the analytics module and displayed in a table format 1902. The relevant targets 1904 are listed for each parameter. For example, in the table depicted in FIG. 19, the parameter 2.1.15:thickness is significant for the three regression targets FinCD_Top, FinCD_Bot, GapCD_Top. Users enter the desired lower and upper bounds on each parameter.

Figure 20:
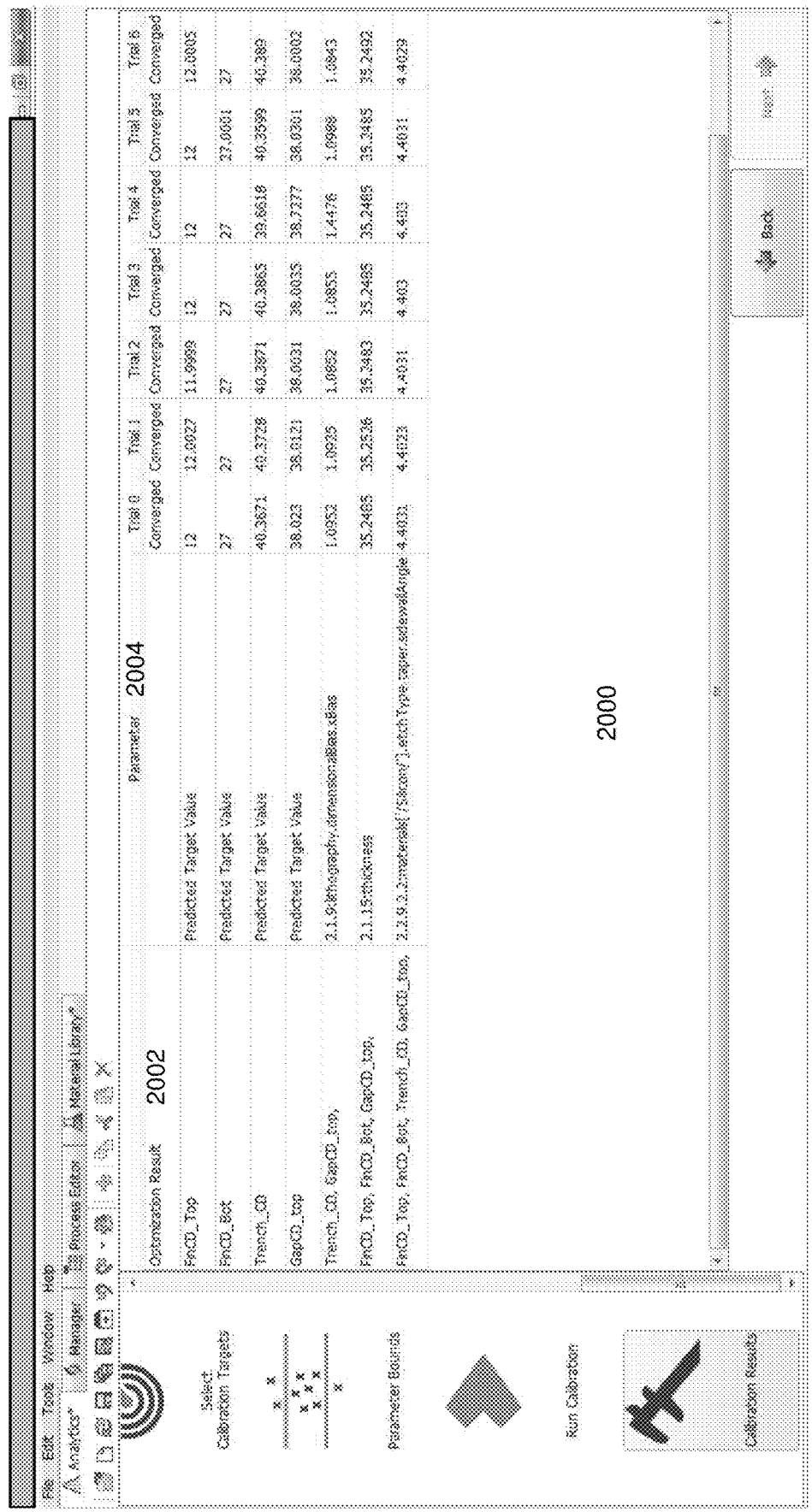
FIG. 20 depicts an exemplary display of results provided by a process model calibration UI in an exemplary embodiment.

The process model calibration wizard may then provide a run button to start the calibration and the results may be displayed to the user via a user interface 2000 as depicted in FIG. 20. For example, the results 2002 may be displayed in a table format from an internal or external simulation environment and may display trial number, optimization result, predicted target results, and values for parameters 2004. In one embodiment, the displayed view may enable the user to select a column in the table to export or automatically build a model in the 3D view of the virtual fabrication environment using the parameters from a particular successful trial.

Variability Analysis

Variability analysis helps the user analyze and understand the variability in metrology data obtained for a set of virtual 3D models. In one embodiment the analytics module in the virtual fabrication environment can perform variability analysis to generate a user interface that displays a table of calculated information about the target distribution, plots of target data histogram and normal quantiles, and provides the ability to switch to a second plot window, select up to four targets and plot/compare their empirical cumulative distribution functions. Further, the variability analysis as described herein provides estimates of the precision of the standard deviation (sigma) and its interrelationship with sample size, methods for assessing if target data is normally distributed, and consistent methods for visual comparison.

Variability analysis is a task where the user assesses the distribution of values for a target (metrology, structure search, DTC checks, electrical analysis, etc.) obtained from multiple virtual semiconductor structures created in a virtual fabrication environment. The purpose is to determine nominal values, ranges, specification limits, etc. for that target. Conventional virtual fabrication environments for semiconductor device structures lack system-level components enabling proper variability analysis. Many semiconductor process integration engineers have little or no statistical knowledge and consequently those engineers perform variability analysis in an incomplete and/or incorrect fashion. Target data may be assumed to be normally distributed, which may not be the case, and if the target data is not normally distributed, then mean and sigma values are misleading. Even if the target data is normally distributed, the proper sample size needed to attain useful precision of sigma is usually not addressed in the Monte Carlo simulation/ experimental design. Users frequently overestimate or underestimate the sample size, which wastes time and/or leads to a poor quality answer. Further, visualization and comparison of distributions are done in different software packages in different ways, or not at all, which leads to confusion among users.

To address these issues, in one embodiment the analytics module is designed to perform variability analysis so as to provide automated statistical analysis, optimization, and visualization for users (e.g.: semiconductor process integrators with limited or no statistical knowledge) in a virtual fabrication environment.

Figure 21:
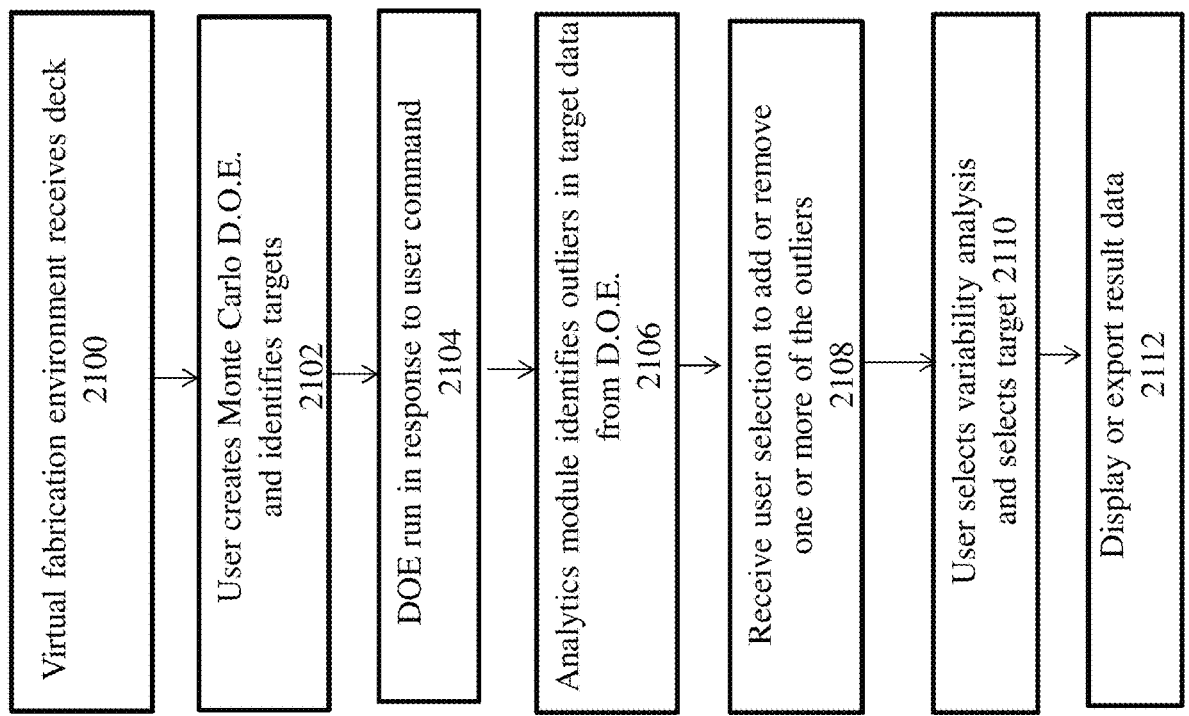
FIG. 21 depicts a sequence of steps used to perform variability analysis in an exemplary embodiment.

FIG. 21 depicts a sequence of steps to perform variability analysis in an exemplary embodiment. The sequence begins with the receipt of a user identification of a deck (layout data and process steps) used by the virtual fabrication environment to produce a virtual 3D model of the semiconductor device structure of interest (step 2100). The user creates a Monte Carlo D.O.E. and identifies targets for the 3D model (step 2102). Multiple virtual fabrication runs are then performed for the Monte Carlo D.O.E. (step 2104). As discussed further below, in one embodiment a reduced set of approximately 200 runs is performed. The analytics module identifies outliers in the target data produced by the virtual fabrication runs in the manner described above (step 2106). The identified outliers are displayed to the user and a user selection adding one or more of the outliers back into the target data or removing the outliers from the target data for each target is received via a provided user interface (step 2108). The user selects the variability analysis option via the user interface and selects one or more targets for the analysis (step 2110). The variability analysis results are then displayed to the user in different forms, such as, but not limited to, a tabular distribution data, plots of target data histogram and normal quantiles, or the results may be exported to a third party application for additional processing (step 2112). If desired, the user can switch to a second plot window, an Empirical Cumulative Distribution Function (ECDF) window, and select up to four targets and the analytics module will plot/compare their empirical distribution functions.

Figure 22:
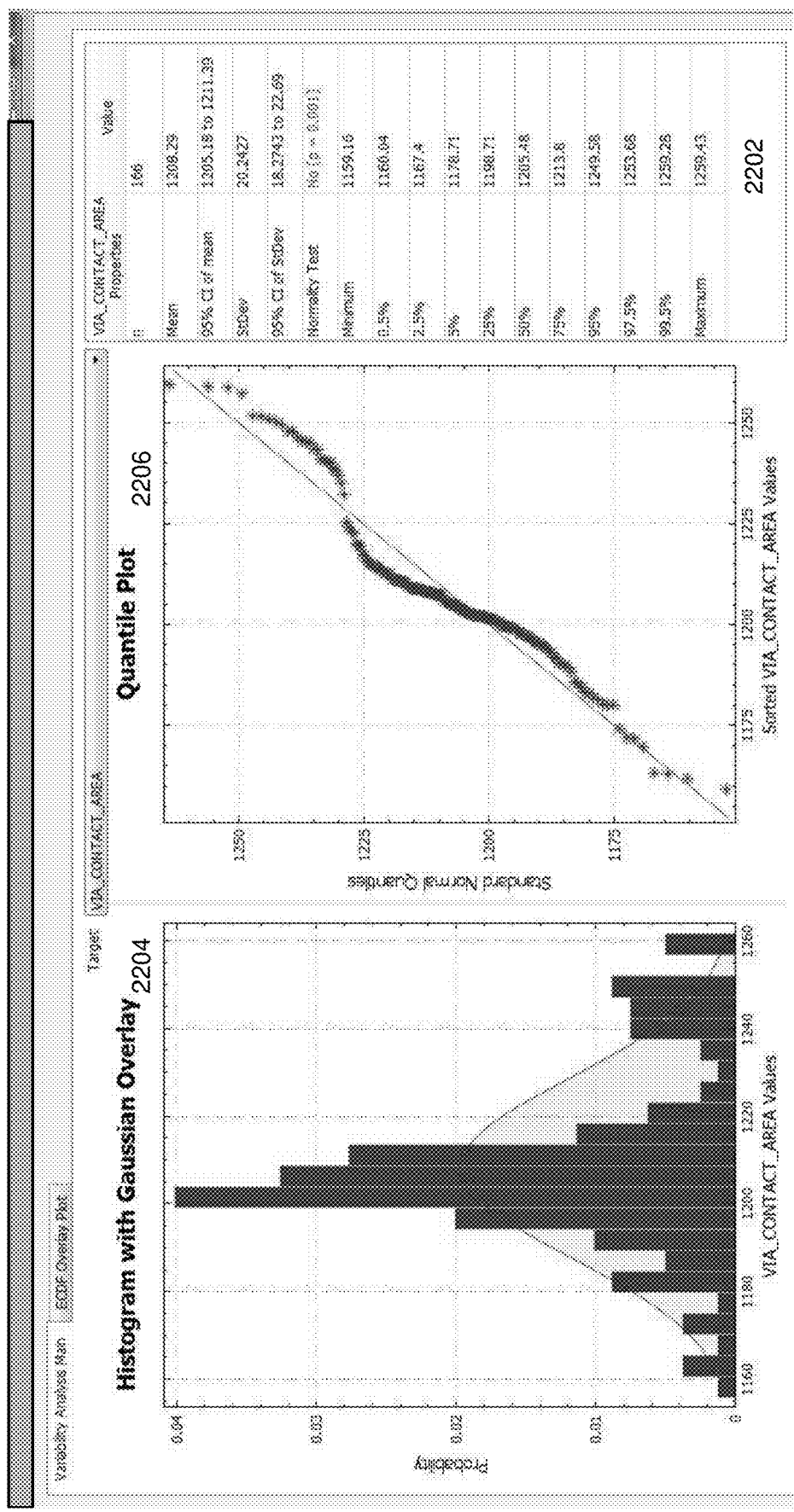
FIG. 22 depicts an exemplary user interface displaying a variable analysis results window in an exemplary embodiment.

FIG. 22 depicts an exemplary user interface displaying a variable analysis results window 2200 in an exemplary embodiment. For the selected target, the variability analysis main window shows a table 2202 and two plots, the histogram 2204 and the normal quantile 2206. The table 2202 contains multiple pieces of calculated information for the selected target: For example:

- n is the number of data points used in the calculations (the user may add/remove outliers and therefore the actual number of data points used is shown here);
- mean and 95% CI (confidence interval) of mean;
- Standard deviation and 95% confidence interval for the standard deviation. The 95% CI is very important for the user to know, because it is an estimate of the precision of the standard deviation (sigma). If n=200, the 95% CI is approximately ±10%, which has been found to be useful in estimating specification limits. A sample size of 200 is much smaller than is commonly recommended for Monte Carlo simulations (the usual recommendation is 10,000) but provides precision of ±10% which is acceptable for some of use cases. Users can adjust sample size (n) to improve precision (CI) for sigma and mean as desired. In another embodiment, the sample size for the Monte Carlo simulation is less than five hundred.
- Normality Test—the result of the Lilliefors Normality Test applied to the selected target, reported as p-value and whether it is statistically significant (yes/no). This is the first of multiple methods used by the analytics module to assess whether the target data is normally distributed;
- Percentiles—min, 0.5%, 2.5%, 5%, 25%, 50% (median), 75%, 95%, 97.5%, 99.5%, max for the selected target.

The variability analysis main window may also display a histogram plot, a histogram of the data for the selected target, with a normal pdf overlaid for visual comparison of normality. If the histogram bars follow the normal pdf, the target data can be said to be normally distributed. This is a second method provided by the analytics module for testing normality of target data.

The variability analysis main window may further display a normal quantile plot of the selected target data. If the points fall close to or on the line, the target data can be said to be normally distributed. This is a third method provided by the analytics module for testing normality of target data. It will be appreciated that additional methods for testing normality of target data not explicitly discussed herein may also be performed by the analytics module and should be considered to be within the scope of the present invention.

Figure 23:
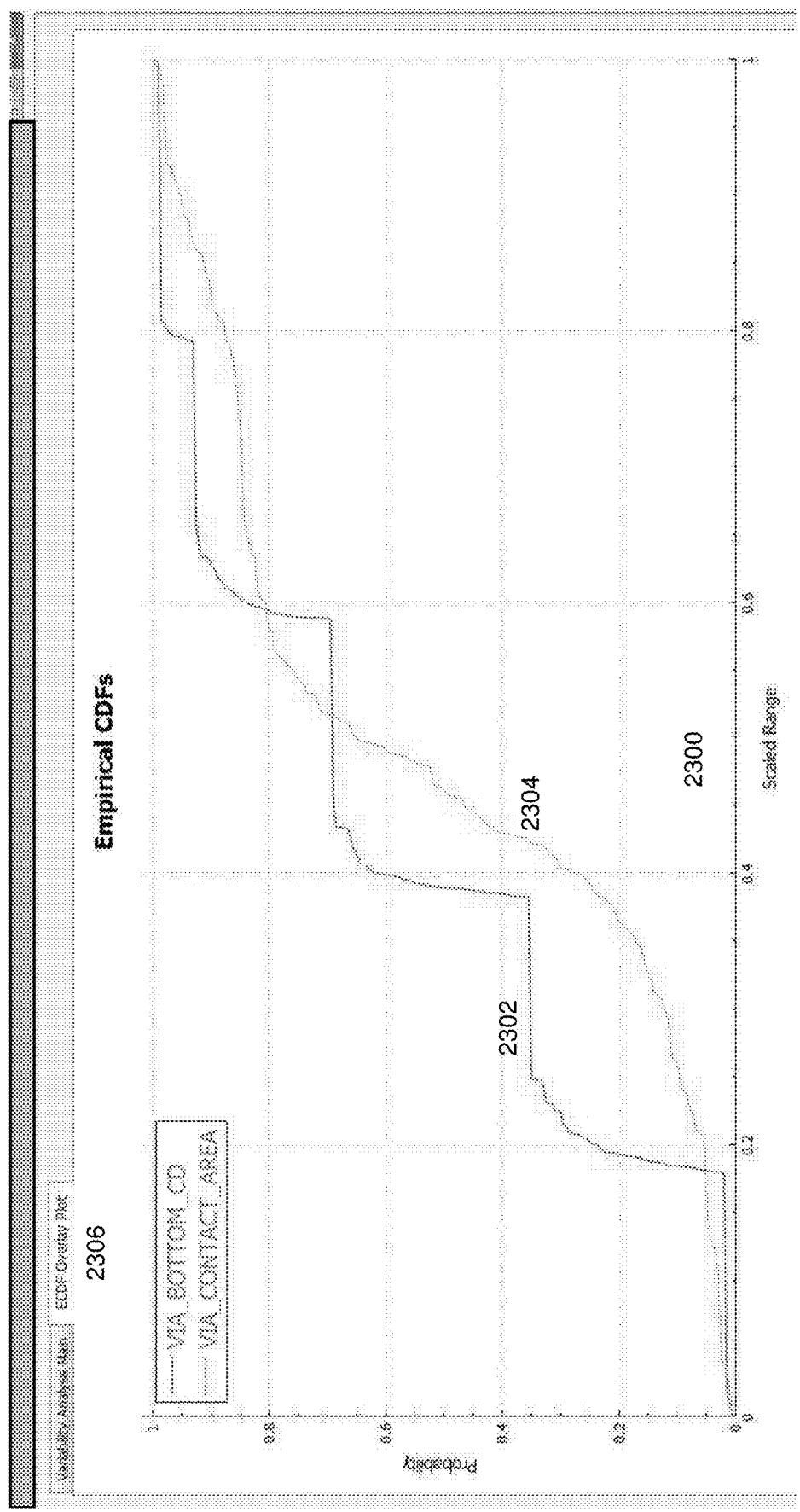
FIG. 23 depicts an exemplary user interface displaying a comparison of variable analysis results for four separate targets in an exemplary embodiment.

The analytics module may also generate the display of a second window for displaying variability analysis results. FIG. 23 depicts an exemplary user interface 2300 displaying a comparison of empirical cumulative distribution functions of two separate targets 2302, 2304 in an exemplary embodiment. For example, the user may click on the tab 2306 for the ECDF Window and select up to four targets to plot and compare their empirical cumulative distribution functions. The x-axis is the target data scaled to be in the range 0 to 1, and the y-axis is the cumulative probability from 0 to 1. This enables users to compare target distributions in an equivalent fashion and examine tail effects which are important in specification limit setting.

The multiple methods for assessing normality that are made available by the analytics module allow the user to determine whether they should treat the target data as being normally distributed. If the target data is normally distributed, the user can use the mean and standard deviation to estimate the commonly used three or four sigma points for setting specification limits. If the data is not normally distributed, then the user may estimate useful specification limit points from the percentiles and min/max displayed in the table, as well as from the tails of the ECDF plot. In another embodiment, the target data may be automatically fit with Gaussian mixture models and thus used to estimate useful points for specification limit settings. In an embodiment a variant of this approach is a feature allowing the user to fit the data with variety of other known distributions, e.g., F or t distributions, and thereby estimate useful points for specification limit settings.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory computer-readable medium holding computing device-executable instructions for performing variability analysis, the instructions when executed causing at least one computing device equipped with at least one processor to:

perform in a virtual fabrication environment a plurality of virtual fabrication runs for a semiconductor device based on a Design of Experiment (DOE) using 2D design data and a process sequence, the plurality of virtual fabrication runs building a plurality of 3D models;

receive, via a user interface of the virtual fabrication environment, a user selection of one or more targets in the plurality of 3D models on which to perform a variability analysis;

display, via the user interface results from the variability analysis, wherein the user interface includes a graph of a distribution of values of the selected one or more targets and an indication of normality of the values of the selected one or more targets;

receive, via the user interface, a selection of a different target in the plurality of 3D models; and update the variability analysis presented in the user interface to include variability associated with the selected different target.

2. The medium of claim 1, wherein the DOE is a Monte Carlo simulation.

3. The medium of claim 1, wherein the plurality of virtual fabrication runs numbers approximately 200.

4. The medium of claim 1, wherein the results from the variability analysis enable assessment of a precision of sigma.

5. The medium of claim 1, wherein results from the variability analysis enable assessment of target data normality.

6. The medium of claim 1, wherein the results from the variability analysis are displayed simultaneously for a plurality of targets.

7. The medium of claim 1, wherein the selected targets are one or more of a metrology target, structure search target, DTC check target or electrical analysis target.

8. A computing device-implemented method, the computing device equipped with at least one processor, the method comprising:

performing in a virtual fabrication environment a plurality of virtual fabrication runs for a semiconductor device based on a Design of Experiment (DOE) using 2D design data and a process sequence, the plurality of virtual fabrication runs building a plurality of 3D models;

receiving, via a user interface of the virtual fabrication environment, a user selection of one or more targets in the plurality of 3D models on which to perform a variability analysis; and displaying, via the user interface results from the variability analysis, wherein the user interface includes a graph of a distribution of values of the selected one or more targets and an indication of normality of the values of the selected one or more targets;

receiving, via the user interface, a selection of a different target in the plurality of 3D models; and updating the variability analysis presented in the user interface to include variability associated with the selected different target.

9. The method of claim 8, wherein the DOE is a Monte Carlo simulation.

10. The method of claim 8, wherein the plurality of virtual fabrication runs numbers approximately 200.

11. The method of claim 8, wherein the results from the variability analysis enable assessment of a precision of sigma.

12. The method of claim 8, wherein results from the variability analysis enable assessment of target data normality.

13. The method of claim 8, wherein the results from the variability analysis are displayed simultaneously for a plurality of targets.

14. The method of claim 8, wherein the selected targets are one or more of a metrology target, structure search target, DTC check target or electrical analysis target.

15. A virtual fabrication system, comprising:

a computing device equipped with a processor and configured to generate a virtual fabrication environment, the virtual fabrication environment:

performing a plurality of virtual fabrication runs for a semiconductor device based on a Design of Experiment (DOE) using 2D design data and a process sequence, the plurality of virtual fabrication runs building a plurality of 3D models;

receiving, via a user interface of the virtual fabrication environment, a user selection of one or more targets in the plurality of 3D models on which to perform a variability analysis; and a display configured to:

display, via the user interface, results from the variability analysis, wherein the user interface includes a graph of a distribution of values of the selected one or more targets and an indication of normality of the values of the selected one or more targets; and responsive to receiving, via the user interface, a selection of a different target in the plurality of 3D models, update the variability analysis presented in the user interface to include variability associated with the selected different target.

16. The system of claim 15, further comprising:

a network interface configured to export results from the variability analysis.

17. The system of claim 15, wherein the plurality of virtual fabrication runs numbers approximately 200.

18. The system of claim 15, wherein the results from the variability analysis enable assessment of a precision of sigma and/or target data normality.

19. The system of claim 15, wherein the results from the variability analysis are displayed simultaneously for a plurality of targets.

20. The system of claim 15, wherein the selected targets are one or more of a metrology target, structure search target, DTC check target or electrical analysis target.

* * * * *